United States Patent
Ichiro et al.

(10) Patent No.: US 6,339,926 B1
(45) Date of Patent: Jan. 22, 2002

(54) STEAM-COOLED GAS TURBINE COMBINED POWER PLANT

(75) Inventors: Hiraga Ichiro; Yuichi Iwamoto; Youichi Hattori; Shinichi Hoizumi, all of Hitachi (JP)

(73) Assignees: Hitachi, Ltd., Tokyo; Hitachi, Engineering Co., Ltd., Ibaraki, both of (JP)

( * ) Notice: Subject to any disclaimer, the term of this patent is extended or adjusted under 35 U.S.C. 154(b) by 0 days.

(21) Appl. No.: 09/444,561

(22) Filed: Nov. 19, 1999

(30) Foreign Application Priority Data

Nov. 20, 1998 (JP) .......................... 10-347855

(51) Int. Cl.$^7$ .............................. F02C 6/18; F02C 7/12; F02C 7/18
(52) U.S. Cl. .................................. 60/39.182; 60/39.75
(58) Field of Search ............................ 60/39.182, 39.75

(56) References Cited

U.S. PATENT DOCUMENTS

| | | | | |
|---|---|---|---|---|
| 4,571,935 A | * | 2/1986 | Rice ......................... | 60/39.182 |
| 4,793,141 A | * | 12/1988 | Yanai et al. .................. | 60/657 |
| 5,170,622 A | * | 12/1992 | Cheng ........................ | 60/39.05 |
| 5,412,937 A | * | 5/1995 | Tomlinson et al. ......... | 60/39.182 |
| 5,428,950 A | * | 7/1995 | Tomlinson et al. ......... | 60/39.182 |
| 5,471,832 A | * | 12/1995 | Sugita et al. ............ | 60/39.182 |
| 5,577,377 A | | 11/1996 | Tomlinson ............... | 60/39.182 |
| 5,579,631 A | * | 12/1996 | Chen et al. ................ | 60/39.05 |
| 6,128,895 A | * | 10/2000 | Takahama et al. ........ | 60/39.182 |

* cited by examiner

*Primary Examiner*—Ted Kim
(74) *Attorney, Agent, or Firm*—Mattingly, Stanger & Malur, P.C.

(57) ABSTRACT

A combined power plant, which has, as one of lines for supplying gas turbine cooling duty steam for cooling hot parts of a gas turbine, a line branching off from a steam line for leading high pressure steam from a high pressure superheater of a multi-pressure heat recovery steam generator to a high pressure steam turbine and leading a part of the high pressure steam to a supply line of the gas turbine cooling duty steam. The combined power plant is provided with a temperature lower limit value setting means for setting a lower limit value of an allowable temperature range for each gas turbine load and supplies a part of hot high temperature steam to the hot part of the gas turbine when the gas turbine cooling duty steam temperature is lower than the lower limit value of the allowable temperature range, thereby to raise the gas turbine cooling duty steam temperature.

7 Claims, 16 Drawing Sheets

STEAM-COOLED GAS TURBINE COMBINED POWER PLANT

BACKGROUND OF THE INVENTION

The present invention relates to a combined power plant using a gas turbine, one or all of hot parts of which are cooled with steam and, more particularly, to a combined power plant having a gas turbine cooling duty steam supply system incorporated therein.

BACKGROUND OF THE INVENTION

The present invention relates to a combined power plant using a gas turbine, one or all of hot parts of which are cooled with steam and, more particularly, to a combined power plant having a gas turbine cooling duty steam supply system incorporated therein.

Conventional heat recovery combined power plants using steam-cooled gas turbines, the hot part of which are cooled with steam, are known in which in view of the conditions of flow rate, pressure and temperature of the steam, at least a part of low temperature reheat steam exhausted from a high pressure steam turbine and an intermediate pressure steam generated in a heat recovery steam generator are supplied. The gas turbine cooling duty steam superheated by cooling is recovered into a high temperature reheat line. Prior art relating to this kind of combining power plant is shown, for example, in U.S. Pat. No. 5,577,377.

In U.S. Pat. No. 5,577,377, as a supply source of gas turbine cooling duty steam, in addition to the low temperature reheat steam and intermediate pressure steam, high pressure steam and high pressure primary superheater outlet steam also are used, which are high in temperature and generated in a heat recovery steam generator before steam is introduced into a steam turbine during start-up of the plant, that is, when low temperature steam is not exhausted from a high pressure steam turbine.

In this kind of combined power plant, usually, the above-mentioned conditions of flow rate, pressure and temperature necessary for the gas turbine cooling duty steam for cooling the hot parts of a gas turbine are determined for each gas turbine load in dependence on conditions of the gas turbine high temperature portions.

In a case where start-up and stop, or, load up and load down, of the plant are operated, the flow rate and pressure of the gas turbine cooling duty steam can be relatively easily regulated to the gas turbine cooling duty steam conditions corresponding to gas turbine loads by regulating valve control. As for the temperature of the gas turbine cooling duty steam, however, when the gas turbine cooling duty steam supply source in normal operation is only low temperature reheat steam and intermediate pressure steam, there is a problem that time delay occurs when the gas turbine cooling duty steam temperature changes according to a change in the gas turbine load and the temperature conditions necessary for the gas turbine cooling duty steam are not satisfied because of thermal transfer between piping for steam and the steam.

SUMMARY OF THE INVENTION

An object of the invention is to supply gas turbine cooling duty steam the temperature of which is within an allowable temperature range of the gas turbine cooling duty steam required for each gas turbine load set for safety operation of a steam-cooled gas turbine even in time of start-up and stop, or, load up and load down, of the plant.

In order to achieve the above object, a temperature lower limit setting means is provided for setting a lower limit of an allowable temperature range of gas turbine cooling duty steam for each load. When the gas turbine cooling duty steam becomes lower then the allowable temperature range of gas turbine cooling duty steam for a certain turbine load, high temperature steam is used for the gas turbine cooling duty steam to raise the gas turbine cooling duty steam temperature.

Further, a temperature lower limit setting means for setting a lower limit of an allowable temperature range of gas turbine cooling duty steam for each load and a cooling duty steam temperature rise control means provided with a temperature judging means for comparing the gas turbine cooling duty steam temperature and the lower limit of the allowable temperature range are provided. Since the allowable temperature range of the gas turbine cooling duty steam rises as a gas turbine load goes up, when the gas turbine cooling duty steam temperature is estimated to become lower than the allowable temperature range during a rise in the gas turbine load, a part of the high temperature high pressure steam is supplied as a part of the gas turbine cooling duty steam prior to load up of the gas turbine. During the gas turbine load up, the gas turbine cooling duty steam is raised in temperature until the gas turbine cooling duty steam temperature reaches a temperature within the allowable temperature range, and then gas turbine load up is effected.

Further, a temperature upper limit setting means is provided for setting an upper limit of an allowable temperature range of gas turbine cooling duty steam for each load, and when the gas turbine cooling duty steam is higher in temperature than the upper limit of the allowable temperature range, low temperature steam is used for the gas turbine cooling duty steam to lower the gas turbine cooling duty steam temperature.

Further, a temperature upper limit setting means for setting an upper limit of an allowable temperature range of gas turbine cooling duty steam for each load and a cooling duty steam temperature down control means provided with temperature judging means for comparing the gas turbine cooling duty steam temperature and the upper limit of the allowable temperature range are provided. Since the allowable temperature range of the gas turbine cooling duty steam is lowered as the gas turbine load goes down, when the gas turbine cooling duty steam temperature is estimated to become higher than the allowable temperature range during gas turbine load down, a part of the high pressure primary superheater outlet steam is supplied as a part of the gas turbine cooling duty steam prior to the gas turbine load down. When lowering the gas turbine load, the gas turbine cooling duty steam temperature is lowered until the gas turbine cooling duty steam temperature reaches a temperature within the allowable temperature range, and then the gas turbine load down is effected.

Further, a temperature upper limit setting means is provided for setting an upper limit of an allowable temperature range of gas turbine cooling duty steam for each load. When the gas turbine cooling duty steam temperature is higher than the upper limit of the allowable temperature range, a part or all of the high pressure primary superheater outlet steam is caused to bypass the high pressure secondary superheater to lower the high pressure steam temperature and the supply low temperature reheat steam lowered in temperature to the gas turbine hot parts, thereby to lower the gas turbine cooling duty steam temperature and supply gas turbine cooling duty steam, the temperature of which is within the allowable temperature range.

Further, a temperature upper limit setting means for setting an upper limit of an allowable temperature range of gas turbine cooling duty steam for each load and a cooling duty steam temperature down control means provided with temperature judging means for comparing the gas turbine cooling duty steam temperature and the upper limit of the allowable temperature range are provided. Since the allowable temperature range lowers as the gas turbine load goes down, when the gas turbine cooling duty steam temperature is higher than the upper limit of the allowable temperature range at the time of gas turbine load down, a part or all of the high pressure primary superheater outlet steam is caused to bypass the high pressure secondary superheater to lower the high pressure steam temperature prior to the gas turbine load down and to supply the low temperature reheat steam lowered in temperature to the gas turbine hot parts. Thus, the gas turbine cooling duty steam temperature is lowered at time of gas turbine load down until the gas turbine cooling duty steam temperature reaches a temperature within the allowable temperature range and then the gas turbine load down is effected.

DESCRIPTION OF EMBODIMENTS

Figure 1:
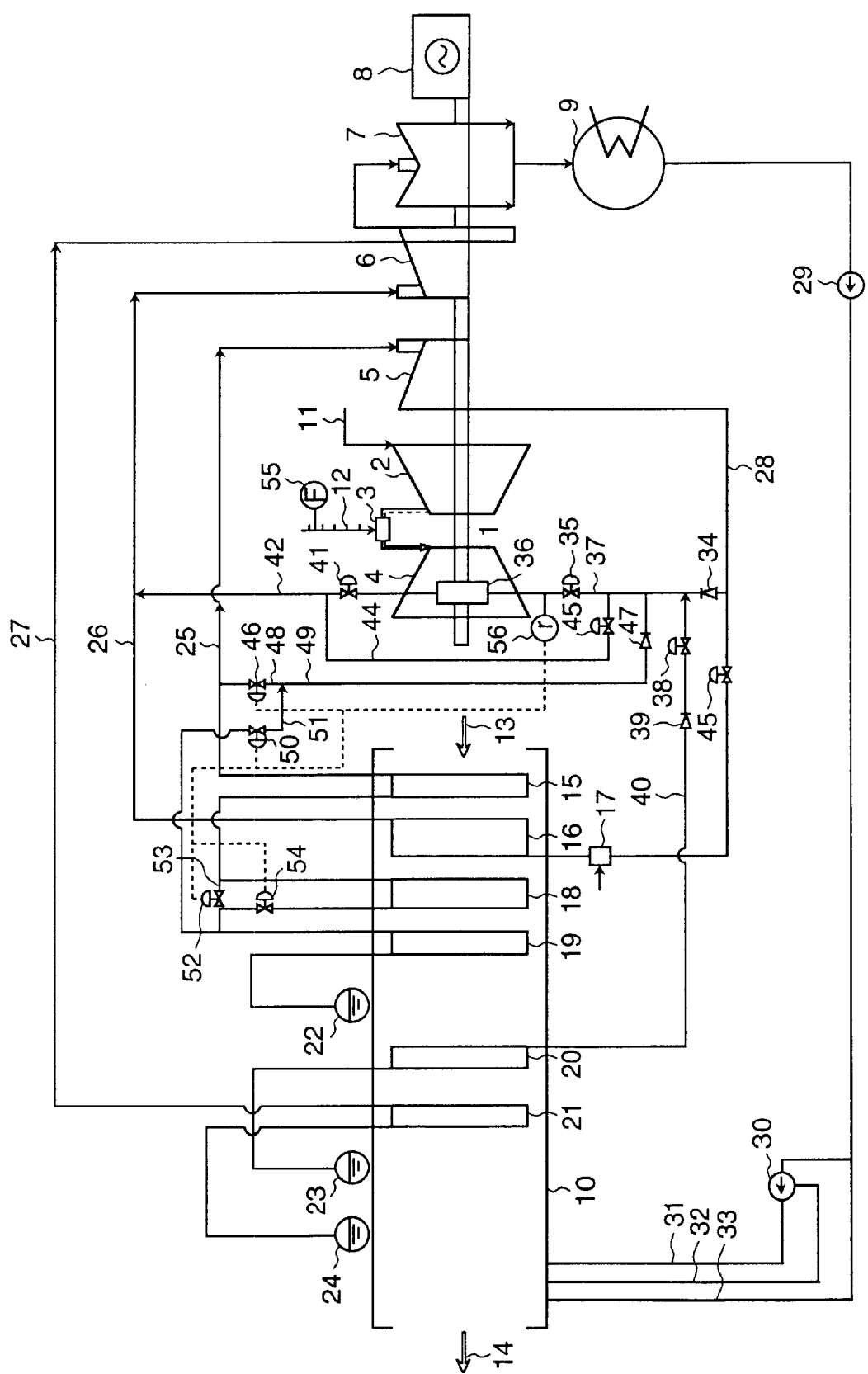
FIG. 1 is a schematic diagram of a whole construction of a combined power plant using a steam-cooled gas turbine of an embodiment of the present invention.

Embodiments of the present invention will be described hereunder, referring to the drawings.

FIG. 1 shows a whole construction of a combined power plant using a steam-cooled gas turbine of an embodiment of the present invention.

In FIG. 1, the combined power plant using the steam-cooled gas turbine has a turbine body 1, an air compressor 2, a combustor 3, a gas turbine 4, a high pressure steam turbine 5, an intermediate pressure steam turbine 6, a low pressure steam turbine 7, a generator 8, a condenser 9 and a multi-pressure heat recovery steam generator 10 (hereunder, simply referred to as boiler).

In the gas turbine body 1, gas turbine compressor inlet suction air 11 is compressed by the air compressor 2 and the compressed delivery air is introduced into the combustor 3. On the other hand, fuel such as natural gas is supplied from a fuel supply system 12 to the combustor 3 and the fuel is mixed with the delivery air and burned to produce high temperature combustion gas. The high temperature combustion gas is used to operate the gas turbine 4. Exhaust gas 13 of high temperature exhausted from the gas turbine 4 heat-exchanges with feed water from feed water lines 31, 32, 33 in the boiler 10, and then turns into low temperature exhaust gas and is exhausted from stacks or the like into the atmosphere.

The boiler 10 utilizes the high temperature exhaust gas 13 to generate steam. The boiler 10 has heat exchangers arranged therein such as a high pressure tertiary superheater 15, a reheater 16, an intermediate pressure superheater 20 connected to an intermediate pressure drum 23, a lower pressure superheater 21 connected to a low pressure drum 24 in order that the heat of high temperature exhaust gas 13 can be effectively recovered. The high pressure steam generated in the high pressure tertiary superheater 15 is delivered to the high pressure turbine 5 through a high pressure steam line 25. The high pressure steam after operating the high pressure turbine 5 turns into low temperature reheat steam and is delivered to the reheater 16 of the boiler 10 through a cold reheat line 28 and a temperature reducer 17 mounted on the cold reheat line 28. The hot reheat steam reheated in the reheater 16 is delivered to the intermediate pressure steam turbine 6 through a hot reheat line 26 and from the intermediate pressure steam turbine 6 is mixed with low pressure steam generated in the low pressure superheater 21 and introduced into the low pressure steam turbine 7 through a low pressure steam line 27.

The generator 8 is mounted on a single shaft on which the gas turbine 4 and high pressure steam turbine 5, and, the intermediate pressure steam turbine 6 and low pressure steam turbine 7 are arranged in tandem, and driven by those turbines to generate power.

The steam from the high pressure steam turbine 5, the intermediate pressure steam turbine 6 and the low pressure steam turbine 7 in the above-mentioned order is condensed in the condenser 9, the condensate is raised in pressure by a condensate pump 29 and a feed pump 30 in turn and returned to the boiler 10 as feed water through feed water lines 31, 32, 33.

In this embodiment, a cooling duty steam supply line 37 is provided, which branches off from the cold reheat line 28, has a check valve 34 and a flow regulating valve 35 and supplies gas turbine cooling duty steam. Gas turbine hot parts 36 are gas turbine buckets, nozzles and shrouds, for example. Further, an intermediate pressure steam line 40, which has a pressure regulating valve 38 and a check valve 39 and leads intermediate pressure steam from the intermediate pressure superheater 20, is connected to the cooling duty steam supply line 37 at a downstream side of the check valve 34. Further, cooling duty steam backup lines 48 and 49 are installed which branch off from the high pressure steam line 25 and have a temperature regulating valve 46 and a check valve 47.

Further, the high pressure superheater is divided into a high pressure primary superheater 19, a high pressure secondary superheater 18 and a high pressure tertiary superheater 15. The steam exited the high pressure drum 22 is led to those high pressure superheaters in series. Further, a steam backup line 51 connected to the cooling duty steam supply line 37 is installed which branches off from a line leading steam from the high pressure primary superheater 19 to the high pressure secondary superheater 18 and has a temperature regulating valve 50. Further, a high pressure secondary superheater bypass line 53 having a temperature regulating valve 52 is installed, which line branches off from piping leading steam from the high pressure primary superheater 19 to the high pressure secondary superheater 18 and having a temperature regulating valve 54 and which line is connected to the high pressure tertiary superheater 15.

The gas turbine cooling duty steam superheated by cooling the gas turbine hot parts 36 is delivered through the cooling duty steam return line 42 having a pressure regulating valve 41 and connected to the hot reheat line 26, mixed with hot reheat steam and then led to the intermediate pressure steam turbine 6. Further, the gas turbine cooling duty steam superheated through the gas turbine hot parts 36 can be mixed with the cold reheat steam by providing a line led from the gas turbine hot parts 36 and connected to the cold reheat line 28 downstream of a flow regulating valve 45. Further, it also can be effected by providing a cooling duty steam bypass line 44 with a flow regulating valve 43, which branches off from the cooling duty steam supply line 37 and is connected to the cooling duty steam return line 42, so that the gas turbine cooling duty steam can bypass the gas turbine hot parts 36.

In this kind combined power plant, usually conditions of flow rate, pressure and temperature the required for gas turbine cooling duty steam for cooling the gas turbine hot parts for each turbine load are indicated on the basis of conditions of the gas turbine hot parts. For example, in all gas turbine loads, the gas turbine cooling duty steam is required to be supplied under the conditions of flow rate of 200 to 250 ton/h, pressure of 3.0 to 4.0 MPa.a and temperature of 330 to 400° C.

Figure 2:
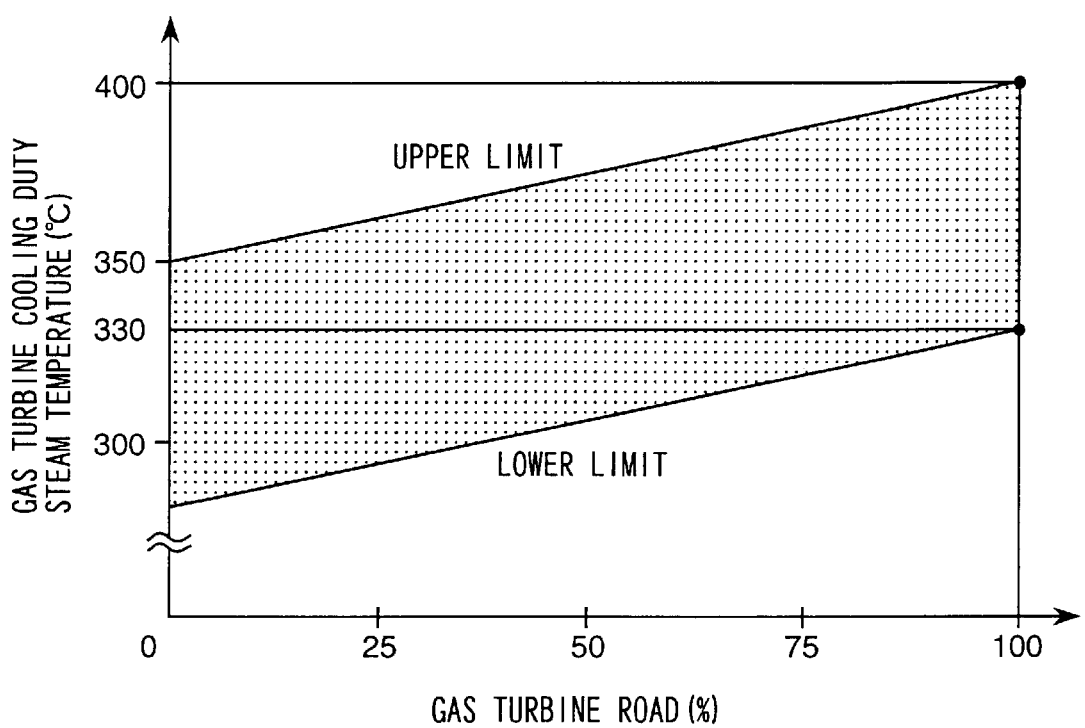
FIG. 2 is a graph for explanation of an allowable temperature range of gas turbine cooling duty steam.

FIG. 2 shows an example of an allowable temperature range of gas turbine cooling duty steam temperature required for each gas turbine load. A region between an upper limit and lower limit of gas turbine cooling duty steam temperature on an abscissa, indicated corresponding to gas turbine loads (%) on an ordinate is an allowable temperature range for gas turbine safety operation.

In the present embodiment, in order to satisfy the conditions of cooling duty steam required for cooling gas turbine hot parts, the gas turbine cooling duty steam (supply line 37) is used after being mixed with a part or all of cold reheat steam (supply line 28) and all of intermediate pressure steam (supply line 40) during usual operation (at time of steady load).

Here, for example, under full load, the cold reheat steam, the intermediate pressure steam and the mixed gas turbine cooling duty steam, used for gas turbine cooling duty steam are flow rate of 190 ton/h, pressure of 3.8 MPa.a and temperature of 370° C.; flow rate of 40 ton/h, pressure of 3.8 MPa.a and temperature of 340° C.; and flow rate of 230 ton/h, pressure of 3.8 MPa.a and temperature of 365° C., respectively.

In the case where plant start-up and stop and plant load up and load down are effected, the conditions necessary for the gas turbine cooling duty steam also change according to change in gas turbine load. In this case, as for flow rate and pressure supplied, of the gas turbine cooling duty steam, their regulation according to the conditions necessary for the gas turbine cooling duty steam is relatively easily effected by control of the regulating valves. For example, the flow regulation of cooling duty steam supplied to the gas turbine hot parts 36 can be effected by a flow regulating valve 35 or 43 or 45, any combination of them or all of them. Further, the pressure regulation of cooling duty steam supplied to the gas turbine hot parts 36 also can be effected by use of the pressure regulating valve 41.

However, as for temperature of cooling duty steam supplied to the gas turbine hot part 36, time delay occurs because of heat transfer between piping for steam and the steam when the temperature of gas turbine cooling duty steam is raised or lowered according to gas turbine load change, and such a problem is left that the temperature condition necessary for the gas turbine cooling duty steam is not satisfied as shown in FIG. 2.

Therefore, in a first aspect of practical use of the present invention, in order to effect safety operation of the gas turbine, in the case where the gas turbine cooling duty steam temperature is estimated to become lower than a lower limit of the allowable temperature range set for each gas turbine load, steam hotter than the gas turbine cooling duty steam is supplied as backup of the cooling duty steam to raise the temperature of gas turbine cooling duty steam. Selection standard of hot steam used for the backup is that the hot steam is higher in pressure than the gas turbine cooling duty steam. In the power plant of the present embodiment, as the backup steam satisfying the condition, the high pressure steam is taken.

Figure 3:
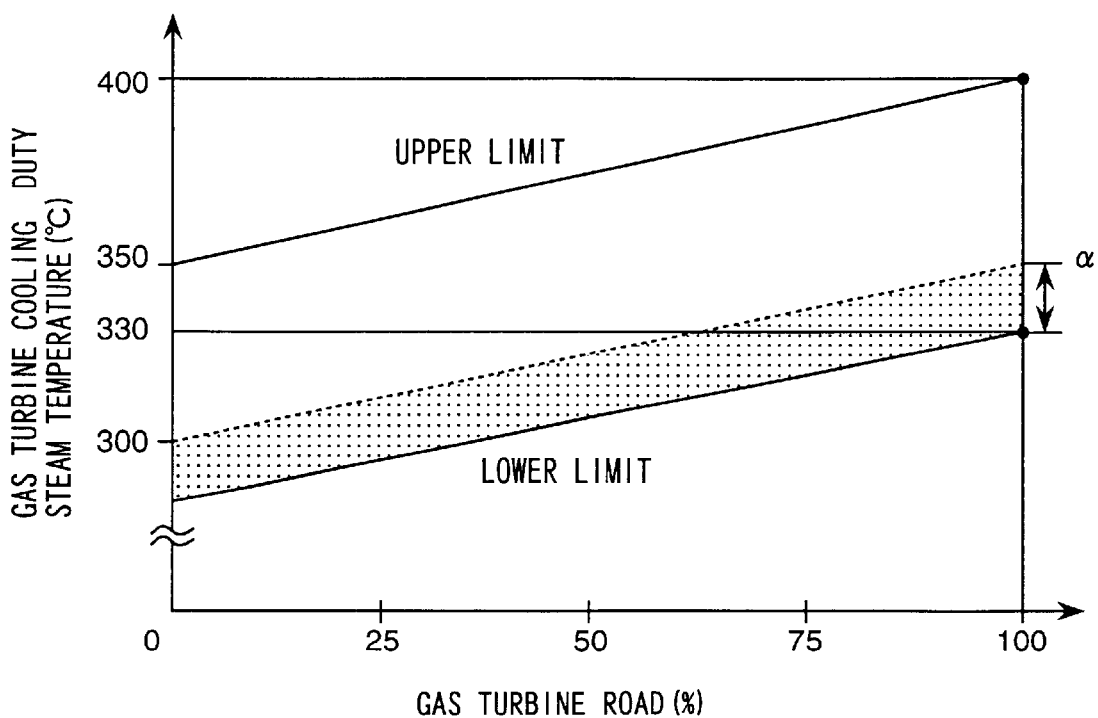
FIG. 3 is a graph for explanation of a temperature lower region of gas turbine cooling duty steam in a first aspect of practical use of the invention.

FIG. 3 shows a lower limit region of the allowable temperature range set for the gas turbine cooling duty steam. In FIG. 3, a lower limit region with a range of $\alpha$ ° C. upward from a necessary temperature lower limit value is set for each turbine load in the allowable temperature range.

Figure 4:
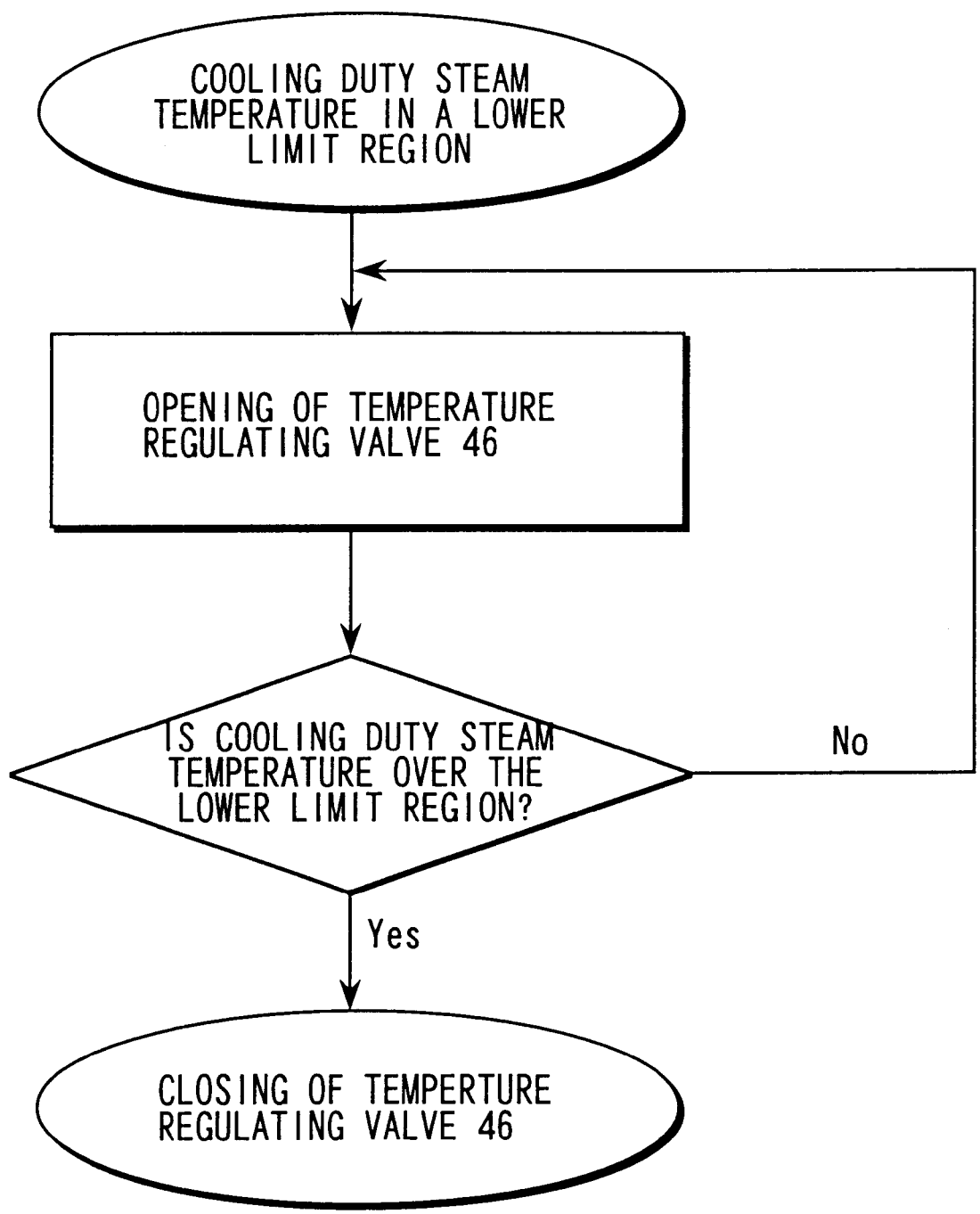
FIG. 4 is a flow chart of control showing the first aspect of the present invention.

FIG. 4 shows a practical use flow chart of high pressure steam backup effected in the first practical use aspect. When the gas turbine cooling duty steam temperature is in the lower limit region, the temperature regulating valve 46 is opened and when it becomes higher than the lower limit region, the temperature regulating valve 46 is closed.

Figure 5:
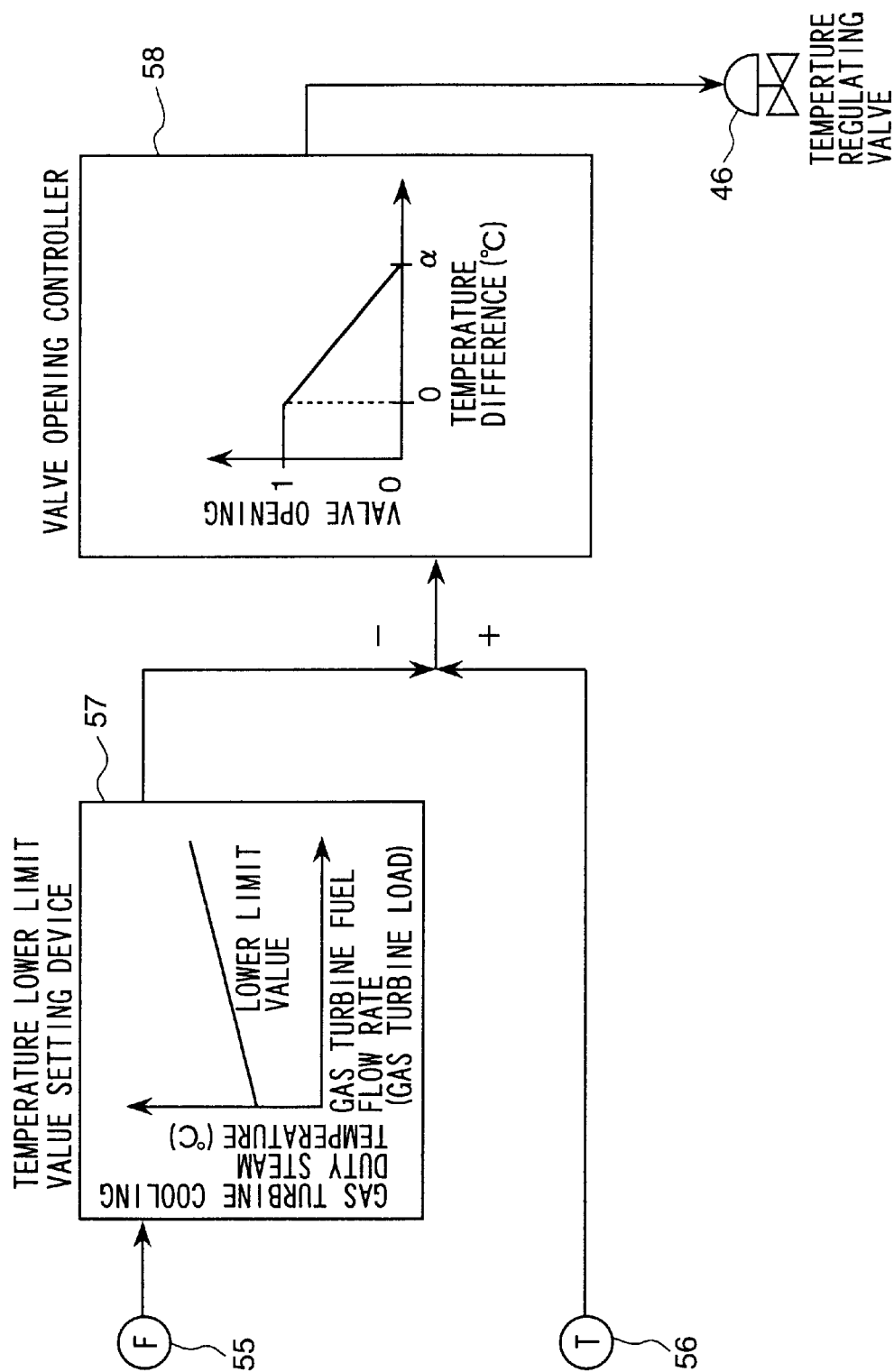
FIG. 5 is a control diagram of the first aspect of practical use of the present invention.

FIG. 5 shows a control diagram of gas turbine cooling duty steam temperature in the first aspect of practical use. A flow rate of gas turbine fuel detected by a fuel flow meter 55 approximately corresponds to a gas turbine load. As data representative of gas turbine loads, other than the fuel flow rate, there are gas turbine suction or exhaust flow rates, compressed air delivery pressure, generator output when a generator is installed only on the gas turbine, or the like.

Lower limit values of the temperature necessary for gas turbine cooling duty steam, set according to gas turbine loads calculated based on the gas turbine fuel flow rates are set by a temperature lower limit setter 57. A valve opening controller 58 controls the temperature regulating valve 46 on the basis of difference between the temperature lower limit value and the gas turbine cooling duty steam supply temperature detected by a thermometer 56. In the valve opening controller 58, when the gas turbine cooling duty steam temperature is at a necessary temperature lower limit value, a signal for fully opening the temperature regulating valve 46 is issued. As the gas turbine cooling duty steam temperature becomes higher than the necessary lower limit value, the opening of the temperature regulating valve 46 is made smaller, and when the gas turbine cooling duty steam temperature is higher by $\alpha$ ° C. than the necessary temperature lower limit value, a signal for closing the temperature regulating valve 46 is issued.

This control enables the gas turbine to safely operate by leading hot high pressure steam to the gas turbine cooling duty steam supply line 37 through the cooling duty steam backup lines 48, 49 to raise the gas turbine cooling duty steam temperature when the gas turbine cooling duty steam temperature is in the necessary temperature lower limit region.

In a second aspect of practical use of the present invention, in the case where in time of gas turbine load up, the gas turbine cooling duty steam allowable temperature range set for safety operation of the gas turbine rises according to gas turbine load-up, the temperature elevation of gas turbine cooling duty steam temperature delays in time relative to the gas turbine load up because of heat transfer between piping for steam and the steam, and the gas turbine cooling duty steam temperature is estimated to become lower than the lower limit of the allowable temperature range. High pressure steam hotter than the gas turbine cooling duty steam is supplied for backup of the cooling duty steam prior to the gas turbine load up, the gas turbine cooling duty steam temperature is elevated until the gas turbine cooling duty steam temperature reaches to such a set value that it will be within the allowable temperature range even during rising in gas turbine load, and then the gas turbine load is raised.

Figure 6:
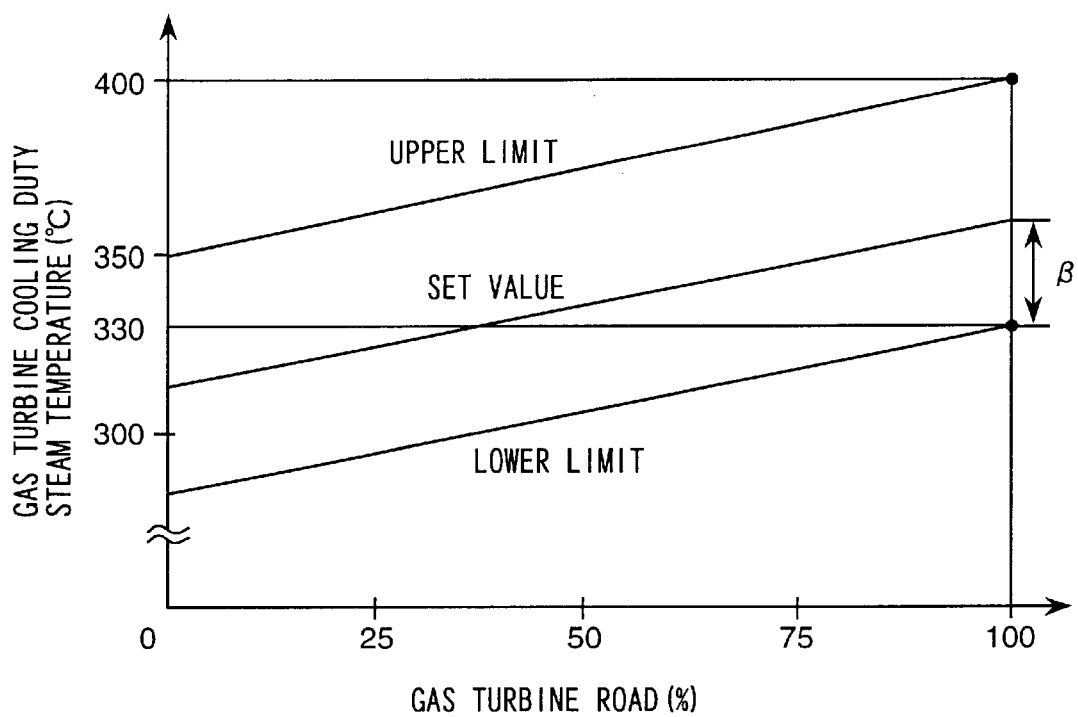
FIG. 6 is a graph of for explanation of temperature setting of gas turbine cooling duty steam at time of load up in a second aspect of practical use of the invention.

FIG. 6 shows cooling duty steam temperature set values which are set for gas turbine cooling duty steam when the gas turbine load is raised. In FIG. 6, the gas turbine cooling duty steam temperature for each turbine load when the gas turbine load is raised, for example, at a rate of 5%/min is set a cooling duty steam temperature obtained by adding $\beta$ ° C. to the lower limit temperature necessary for the cooling duty steam.

Figure 7:
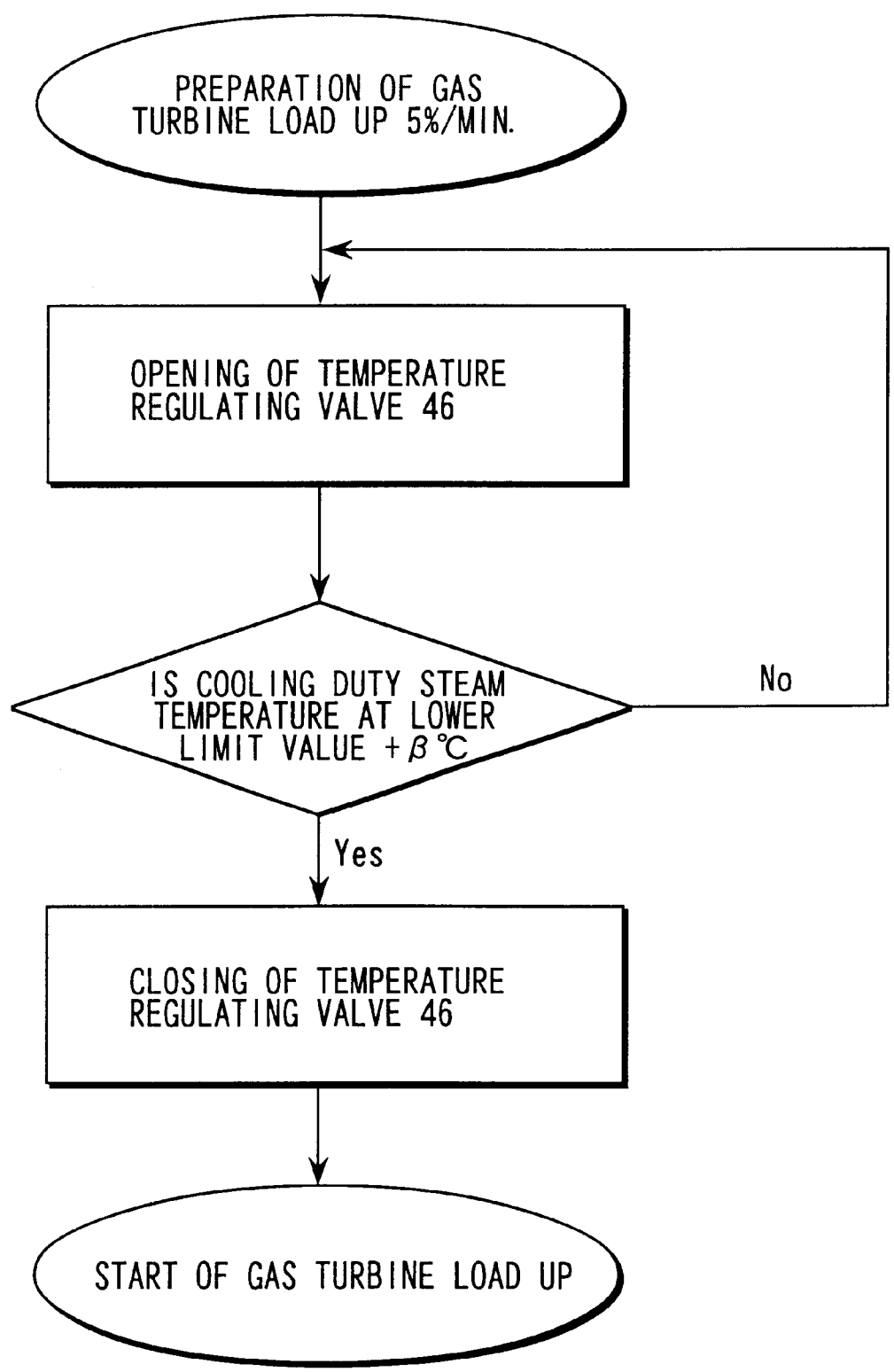
FIG. 7 is a flow chart of control showing the second aspect of practical use of the present invention.

FIG. 7 shows an operation flow chart of high pressure steam backup in the second aspect of practical use. In the case where the gas turbine load is raised at a rate of 5%/min, the temperature regulating valve 46 is opened, and closed when the gas turbine cooling duty steam temperature becomes a temperature in the lower limit region +$\beta$ ° C.

Figure 8:
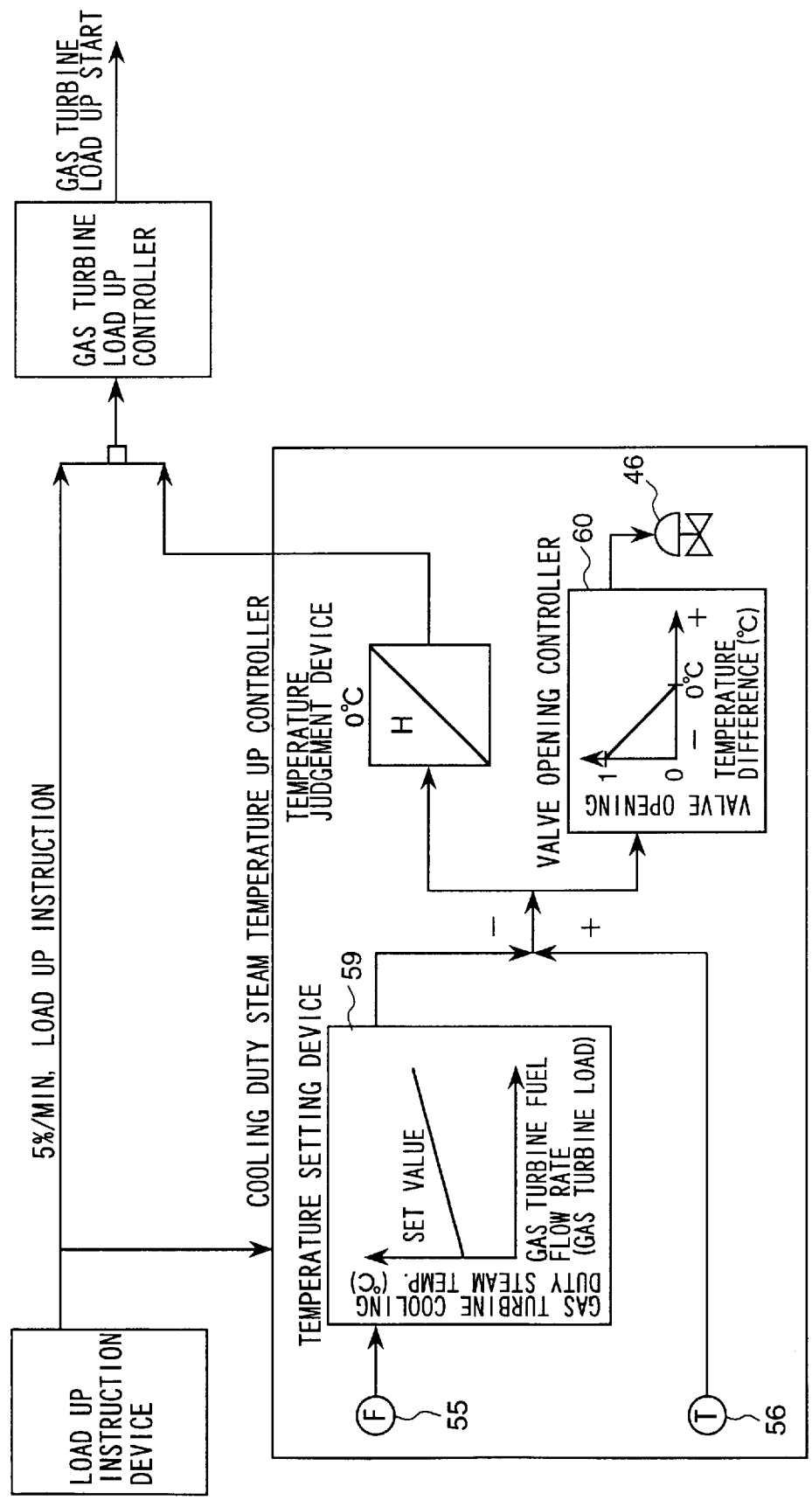
FIG. 8 is a control diagram of the second aspect of practical use of the present invention.

FIG. 8 shows a control diagram of gas turbine cooling duty steam temperature in the second aspect of practical use. Flow rates of gas turbine fuel detected by the fuel flow meter approximately correspond to turbine loads. As data representative of gas turbine loads, other than the flow rates, there are suction air or exhaust gas flow rates of the gas turbine, compressed air delivery pressure, generator output when the generator is installed only on the gas turbine, or the like.

When an instruction of gas turbine load up, for example, at a rate of 5%/min in order to raise the plant load is issued, a cooling duty steam temperature is set by the cooling duty steam temperature setter 59, which temperature is obtained by adding $\beta$ ° C. to the lower limit temperature necessary for the gas turbine cooling duty steam which is set according to the gas turbine load calculated on the basis of a gas turbine fuel flow rate at that time. The valve opening controller 60 regulates the temperature regulating valve 46 on the basis of difference between this temperature set value and a gas turbine cooling duty steam supply temperature measured by the thermometer 56. The valve opening controller 60 issues a signal of opening the temperature regulating valve 46 when the gas turbine cooling duty steam temperature is lower than the temperature set value, decreases the opening of the temperature regulating valve 46 as the gas turbine cooling duty steam temperature approaches to the temperature set value, and issues a signal of closing the temperature regulating valve 46 when the gas turbine cooling duty steam temperature reaches to the temperature set value. On the other hand, a temperature judging unit outputs an ON instruction when a differential value between the gas turbine cooling duty steam temperature and the temperature set value becomes 0° C. or higher, whereby the gas turbine load up controller operates by AND operation with a load up instruction device and the gas turbine load starts to rise.

By this control, the hot high pressure steam is led to the gas turbine cooling duty steam supply line 37 through the cooling duty steam backup lines 48, 49 until the gas turbine cooling duty steam temperature reaches to the temperature set value to raise the gas turbine cooling duty steam temperature, and when the gas turbine cooling duty steam temperature reaches to the temperature set value and such danger disappeared that the gas turbine cooling duty steam temperature becomes lower than the cooling duty steam allowable temperature range even if the necessary temperature of the gas turbine cooling duty steam rises by gas turbine load up, the gas turbine load is raised, whereby the gas turbine can be operated safely.

Further, even during gas turbine load up, it is possible to effect cooling duty steam temperature control along the temperature set value, using the high pressure steam.

In a third aspect of practical use of the present invention, in order to effect safety operation of the gas turbine, in the case where a gas turbine cooling duty steam temperature is estimated to be higher than the upper limit of an allowable temperature range of the gas turbine cooling duty steam, set for each gas turbine load, steam lower in temperature than the gas turbine cooling duty steam is supplied as backup of the cooling duty steam to lower the gas turbine cooling duty steam temperature.

Selection standard of the low temperature steam used for the backup is that the low temperature steam is higher in pressure than the gas turbine cooling duty steam in order to supply the low temperature steam into the gas turbine hot parts. In the case of the power plant of the present embodiment, the steam which satisfies the pressure condition corresponds to the high pressure steam. However, since the high pressure steam is high in temperature, it is necessary to reduce the temperature thereof in order to use it as backup steam. In the plant of the present embodiment, high pressure primary superheater outlet steam is selected for backup of the gas turbine cooling duty steam.

Further, in the case where steam in which mist is mixed is allowed to use as the gas turbine cooling duty steam, it is possible to use a temperature reducing spray in the gas turbine cooling duty steam supply line 37.

Figure 9:
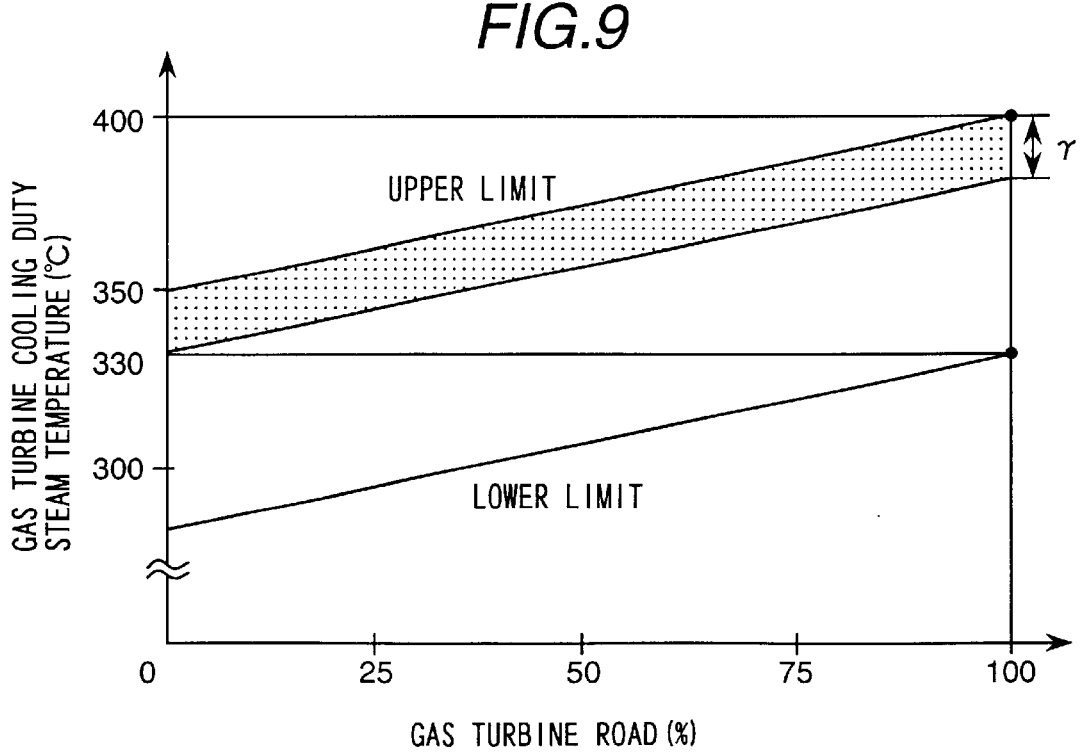
FIG. 9 is a graph for explanation of a temperature upper region of gas turbine cooling duty steam in third and fifth aspects of practical use of the invention.

FIG. 9 shows an upper limit region of an allowable temperature range set for gas turbine cooling duty steam. In FIG. 9, the upper limit region having a width of $\gamma$ ° C. from the upper limit of necessary temperature in an allowable temperature range of the gas turbine cooling duty steam is set for each gas turbine load.

Figure 10:
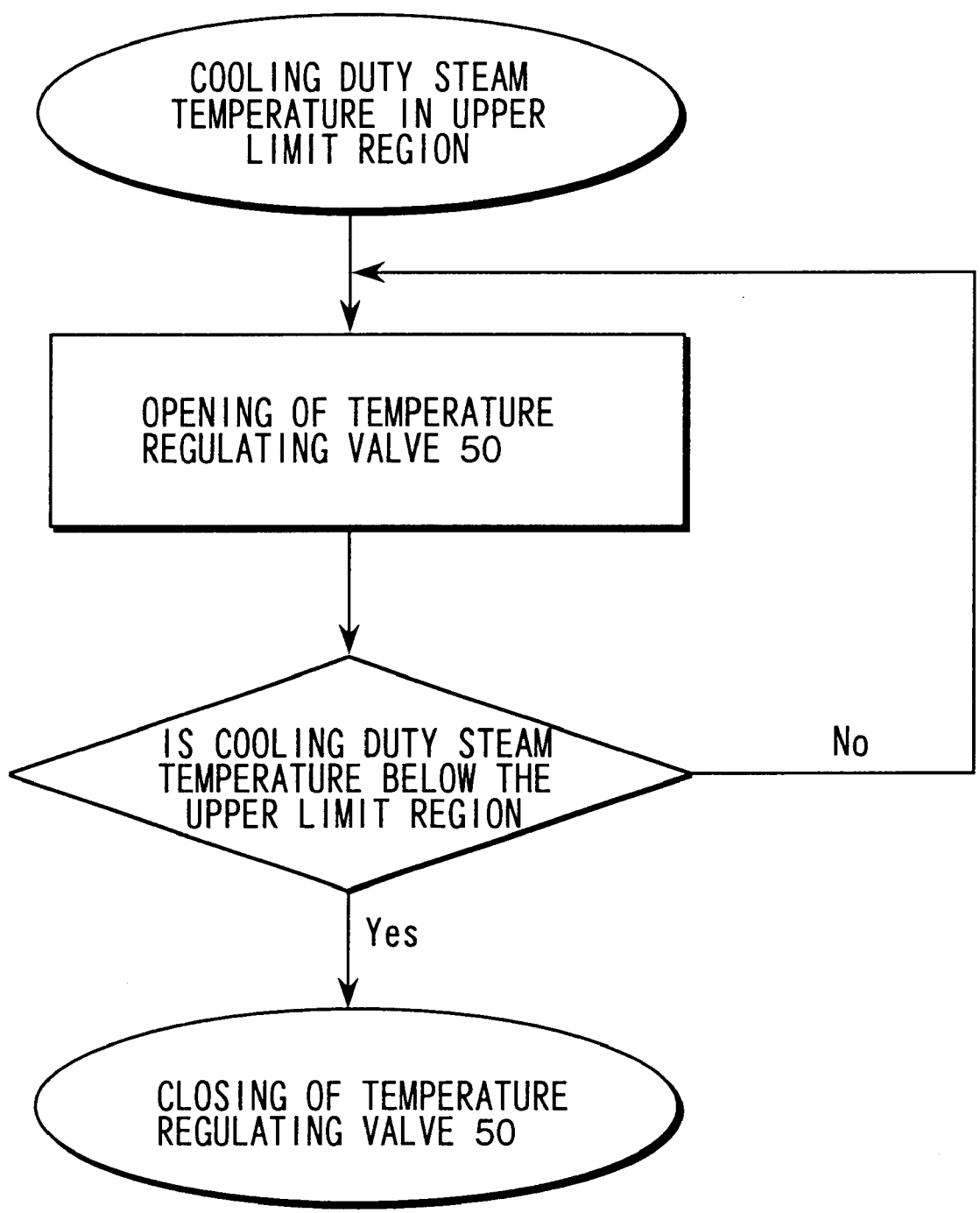
FIG. 10 is a flow chart of control showing the third aspect of practical use of the present invention.

FIG. 10 shows a flow of practical use of backup of high pressure primary superheater outlet steam in the third aspect of practical use. When the gas turbine cooling duty steam temperature reaches to the upper limit region, the temperature regulating valve 50 is opened and when it becomes lower than the upper limit region, the temperature regulating valve 50 is closed.

Figure 11:
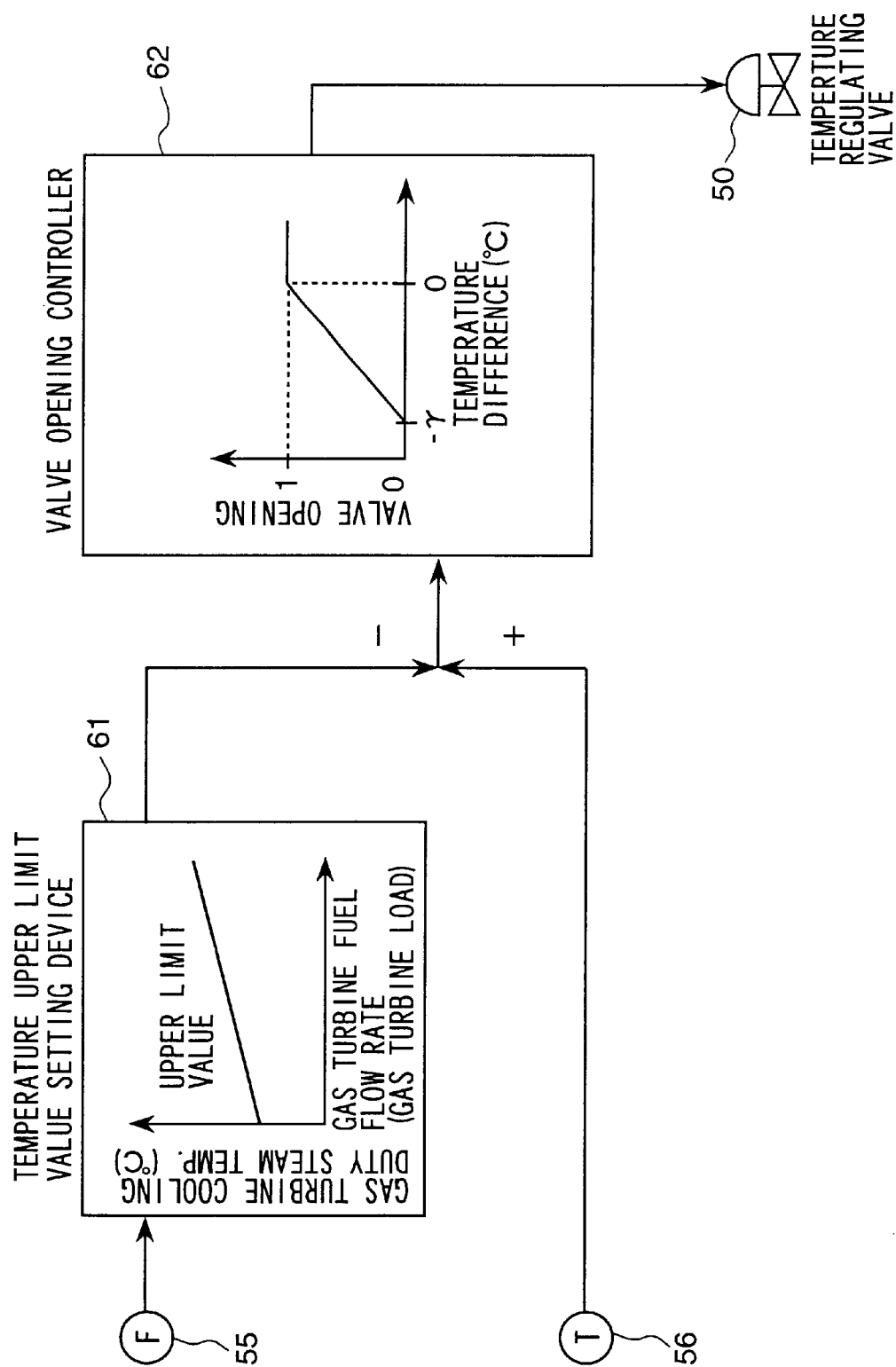
FIG. 11 is a control diagram of the third aspect of practical use of the present invention.

FIG. 11 shows a control diagram of gas turbine cooling duty steam temperature in the third aspect of practical use. Flow rates of gas turbine fuel detected by the fuel flow meter 55 approximately correspond to gas turbine loads. As for data representative of the gas turbine loads other than the above fuel flow rates, there are suction or exhaust gas flow rate of the gas turbine, compressed air delivery pressure, generator output when the generator is mounted only on the gas turbine, or the like.

An upper limit value of necessary temperature of gas turbine cooling duty steam, set according to the gas turbine load calculated from the gas turbine fuel flow rate is set by a temperature upper limit setter 61. A valve opening controller 62 regulates the temperature regulating valve 50 on the basis of difference between the above-mentioned temperature upper limit value and the gas turbine cooling duty steam supply temperature measured by the thermometer 56. The valve opening controller 62 issues a signal of fully opening the temperature regulating valve 50 when the gas turbine cooling duty steam temperature is at the upper limit value of the necessary temperature, decreases the opening of the temperature regulating valve 50 as the gas turbine cooling duty steam temperature becomes lower than the upper limit value of necessary temperature and issues a signal of closing the temperature regulating valve when the gas turbine cooling duty steam temperature becomes lower by $\gamma$ ° C. than the necessary temperature upper limit value.

By this control, high pressure primary superheater outlet steam of low temperature is led to the gas turbine cooling duty steam supply line 37 through the cooling duty steam backup lines 51, 49 when the gas turbine cooling duty steam temperature is in the necessary temperature upper limit region, whereby the gas turbine cooling duty steam temperature is lowered and the gas turbine can be operated in safety.

In a fourth aspect of practical use of the present invention, in time of gas turbine load down, in the case where the allowable temperature range of gas turbine cooling duty steam, set for gas turbine safety operation lowers according to gas turbine load down and the gas turbine cooling duty steam temperature is estimated to become higher than the upper limit of the allowable temperature range because temperature down of the gas turbine cooling duty steam delays in time relative to the gas turbine load down because of heat transfer between the piping for steam and the steam, high pressure primary superheater outlet steam of lower temperature than the gas turbine cooling duty steam is supplied as cooling duty steam backup prior to the gas turbine load down, the gas turbine cooling duty steam temperature is lowered until the gas turbine cooling duty steam temperature reaches to such a set value that the gas turbine cooling duty steam temperature will be within the allowable temperature range even during the gas turbine load down, and then the gas turbine load is decreased.

Further, in the case where the steam in which mist is mixed is allowed to use as gas turbine cooling duty steam, a temperature reducing spray can be used on the gas turbine cooling duty steam line 37.

Figure 12:
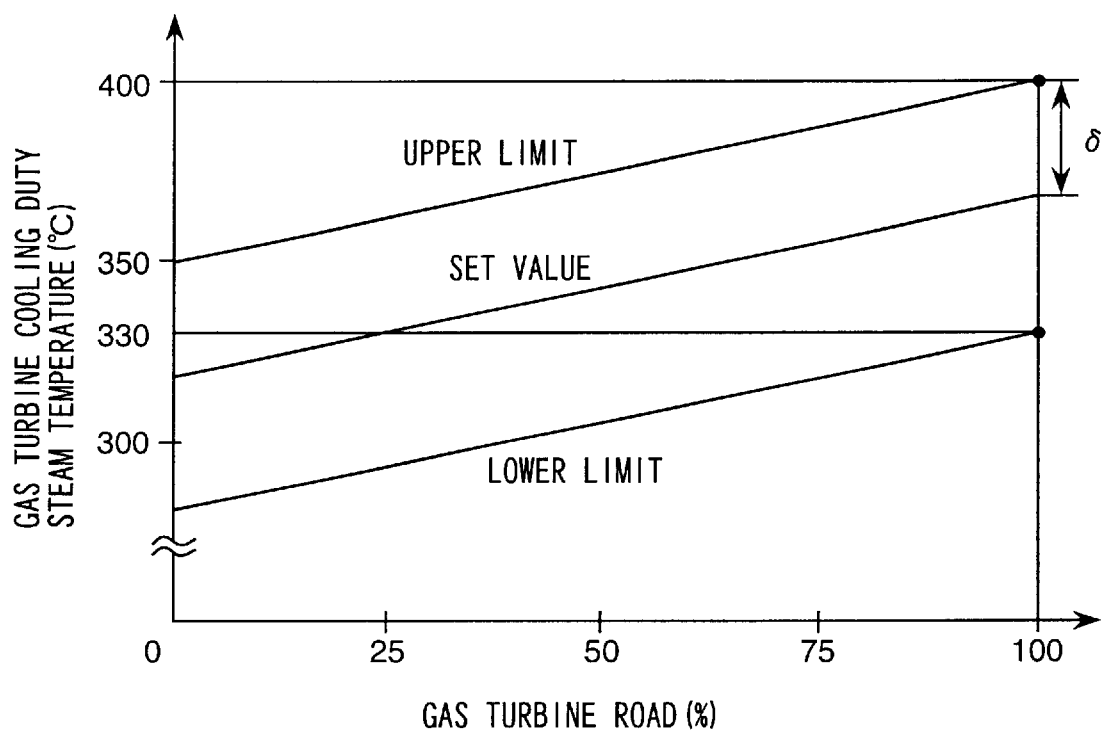
FIG. 12 is a graph for explanation of temperature setting values of gas turbine cooling duty steam at time of load down in fourth and sixth aspects of practical use of the invention.

FIG. 12 shows cooling duty steam temperature set values set for gas turbine cooling duty steam when gas turbine load is decreased. In FIG. 12, the gas turbine cooling duty steam temperature for each gas turbine load when the gas turbine load is decreased, for example, at a rate of 5%/min is set a cooling duty steam temperature which $\delta$ ° C. is subtracted from the cooling duty steam necessary temperature upper limit value.

Figure 13:
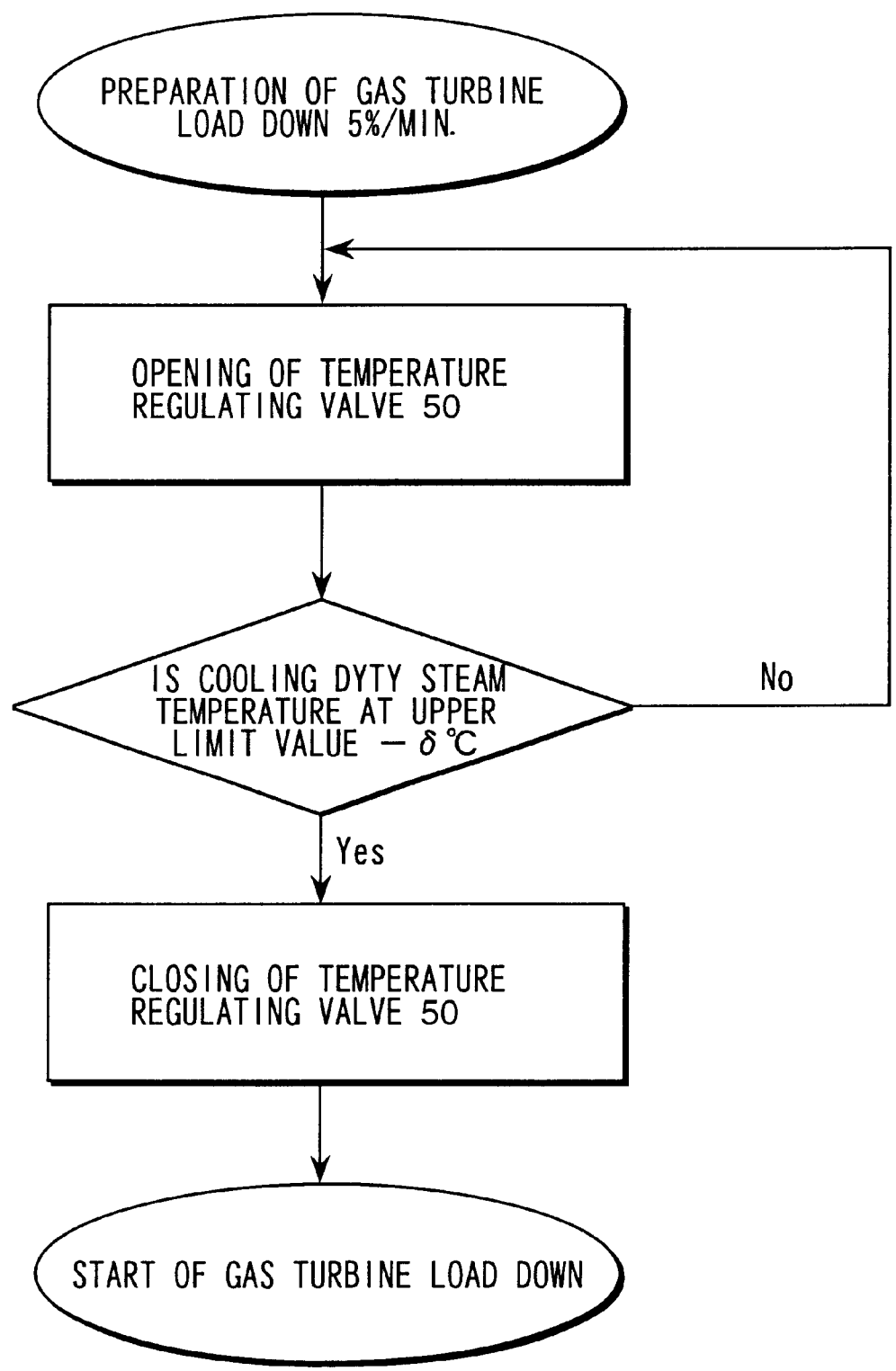
FIG. 13 is a flow chart of control showing the fourth aspect of practical use of the present invention.

FIG. 13 shows a flow chart of high pressure primary superheater outlet steam backup in the fourth aspect of practical use. In the case where the gas turbine load is lowered at a rate of 5%/min, the temperature regulating valve 50 is opened, and when the gas turbine cooling duty temperature becomes a temperature in the upper limit region $-\delta$ ° C., the temperature regulating valve 50 is closed.

Figure 14:
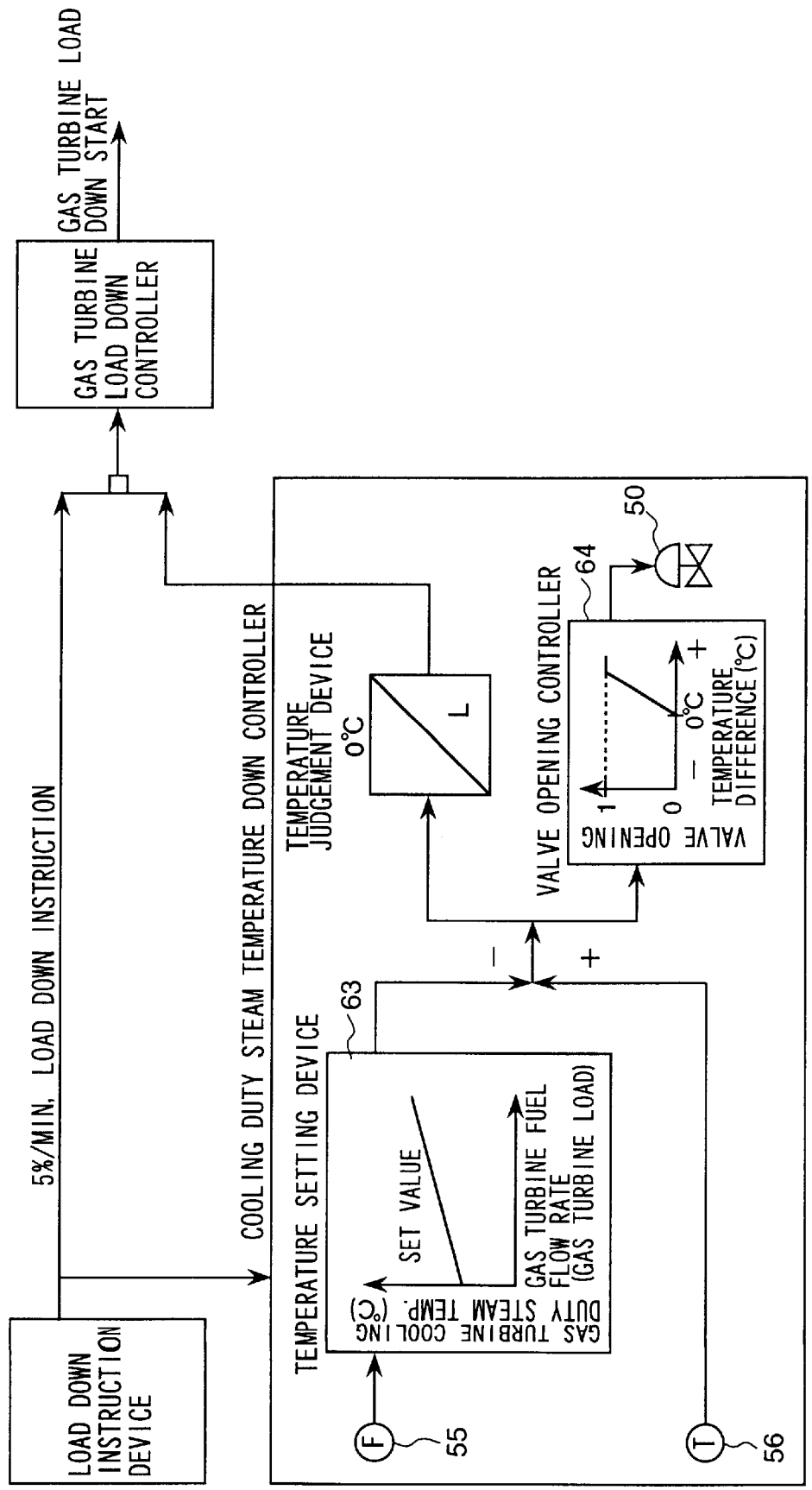
FIG. 14 is a control diagram of the fourth aspect of practical use of the present invention.

FIG. 14 shows a control diagram of gas turbine cooling duty steam temperature in the fourth aspect of practical use. Gas turbine fuel flow rates detected by the fuel flow meter 55 approximately corresponds to a gas turbine load. As for data representative of the gas turbine loads other than the above fuel flow rates, there are suction or exhaust gas flow rate of the gas turbine, compressed air delivery pressure, generator output when the generator is mounted only on the gas turbine, or the like.

In the case where in order to effect plant load down, an instruction that the gas turbine load is lowered, for example, at a rate of 5%/min is issued, the cooling duty steam temperature obtained by subtracting $\delta$ ° C. from the upper limit value of the gas turbine cooling duty steam necessary temperature set according to the gas turbine load calculated on the basis of a gas turbine fuel flow rate at that time is set by the cooling duty steam temperature setter 63. The valve opening controller 64 regulates the temperature regulating valve 50 on the basis of difference between this temperature set value and the gas turbine cooling duty steam supply temperature measured by the thermometer 56. The valve opening controller 64 issues a signal of opening the temperature regulating valve when the gas turbine cooling duty steam temperature is higher than the temperature set value, decreases the opening of the temperature regulating valve 50 as the gas turbine cooling duty steam temperature approaches to the temperature set value, and when the gas turbine cooling duty steam temperature becomes the temperature set value, issues a signal of closing the temperature regulating valve 50. On the other hand, when a differential value between the gas turbine cooling duty steam temperature and the temperature set value becomes 0° C. or less, the temperature judging unit outputs an ON instruction, the gas turbine load down controller operates by an AND operation with the instruction of the load down instruction device and the gas turbine load down starts.

By this control, high pressure primary superheater outlet steam is led to the gas turbine cooling duty steam supply line 37 through the cooling duty steam backup lines 51, 49 until the gas turbine cooling duty steam temperature reaches to the temperature set value to lower the gas turbine cooling duty steam temperature, and when the gas turbine cooling duty steam temperature becomes the temperature set value and such danger disappeared that the gas turbine cooling duty steam become higher than the cooling duty steam allowable temperature range even if the gas turbine cooling duty steam necessary temperature lowers by decreasing the gas turbine load, the gas turbine load is lowered, whereby the gas turbine can be operated in safety.

Further, even during gas turbine load down operation, cooling duty steam temperature control along the set value can be practiced by using the high pressure primary superheater outlet steam.

In a fifth aspect of practical use of the present invention, in order to operate the gas turbine in safety, in the case where the gas turbine cooling duty steam temperature is estimated to become higher than the upper limit value of the gas turbine cooling duty steam allowable temperature range set for each gas turbine load, low temperature reheat steam used as the gas turbine cooling duty steam is lowered in temperature by lowering the high pressure steam temperature and supplied to the gas turbine hot parts, whereby the gas turbine cooling duty steam temperature is operated. In the power plant of the present embodiment, in order to lower the temperature of high pressure steam, a part or all of steam generated in the high pressure primary superheater 19 bypasses the high pressure secondary superheater 18 and introduced into the high pressure tertiary superheater 15.

Further, in the case where steam in which mist is mixed is allowed to use as gas turbine cooling duty steam, a temperature reducing spray can be used for the high pressure steam to lower the temperature thereof. Alternately, the temperature reducing spray can be used on the gas turbine cooling duty steam line 37. Further, in the case where thermal stress generated due to temperature difference between the high pressure steam introduced into the steam turbine and the high temperature high pressure reheat steam, caused by lowering in temperature of the high pressure steam becomes a bar to a rotor or casing of the steam turbine, for example. It is sufficient that the high temperature reheat steam is lowered in temperature, for example, by the temperature reducing spray so as to cope with the temperature reducing spray so as to cope with the temperature reduction of the high pressure steam.

FIG. 9 shows an upper limit region of an allowable temperature range set for gas turbine cooling duty steam. In FIG. 9, the upper limit region having a width of $\gamma$ ° C. from the upper limit of necessary temperature in an allowable temperature range of the gas turbine cooling duty steam is set for each gas turbine load.

Figure 15:
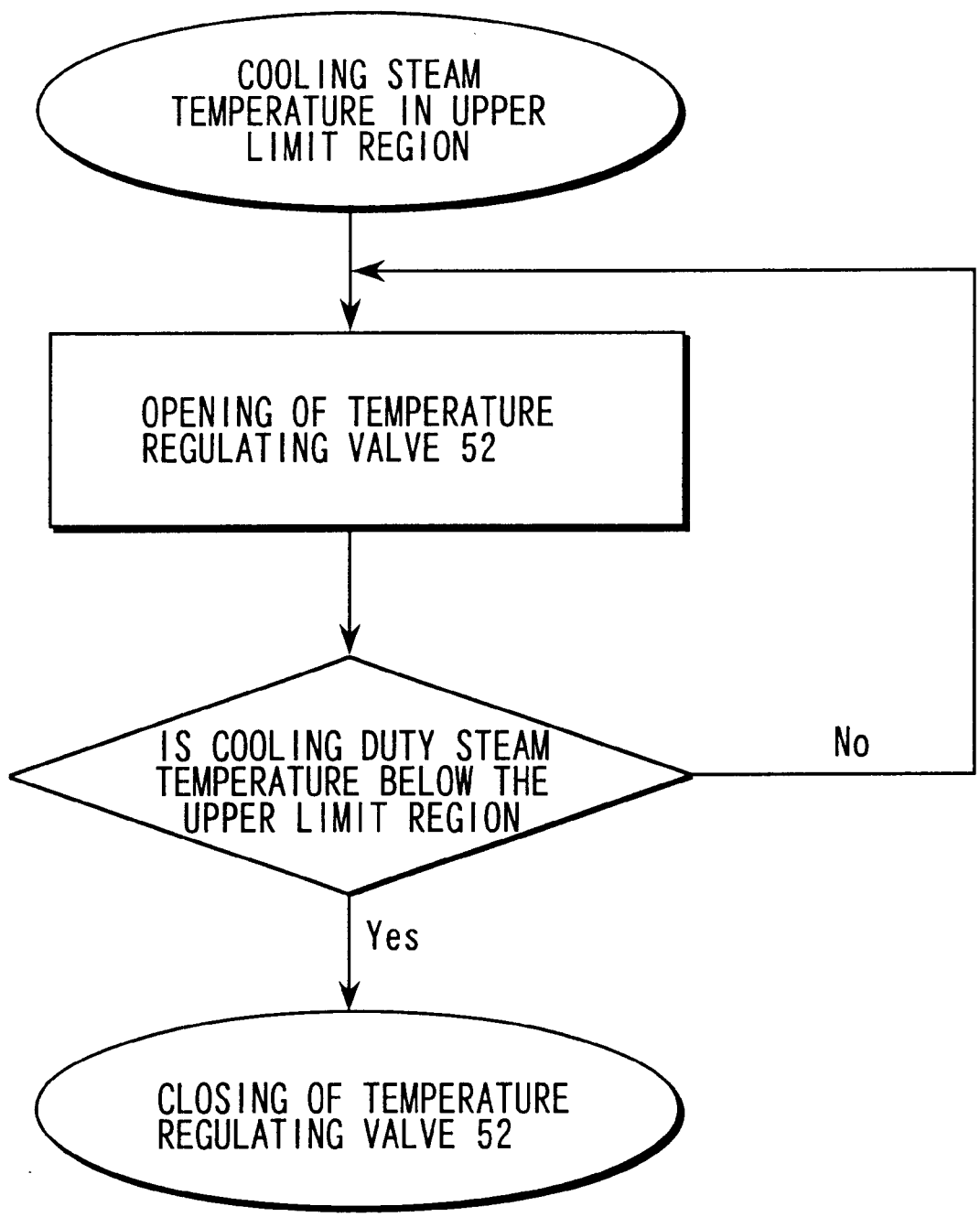
FIG. 15 is a flow chart of control showing the fifth aspect of practical use of the present invention.

FIG. 15 shows a operation flow of high pressure steam temperature down in the fifth aspect of practical use. When the gas turbine cooling duty steam temperature reaches to the upper limit region, the temperature regulating valve 52 is opened, and when it becomes lower than the upper limit region, the temperature regulating valve 52 is closed.

Figure 16:
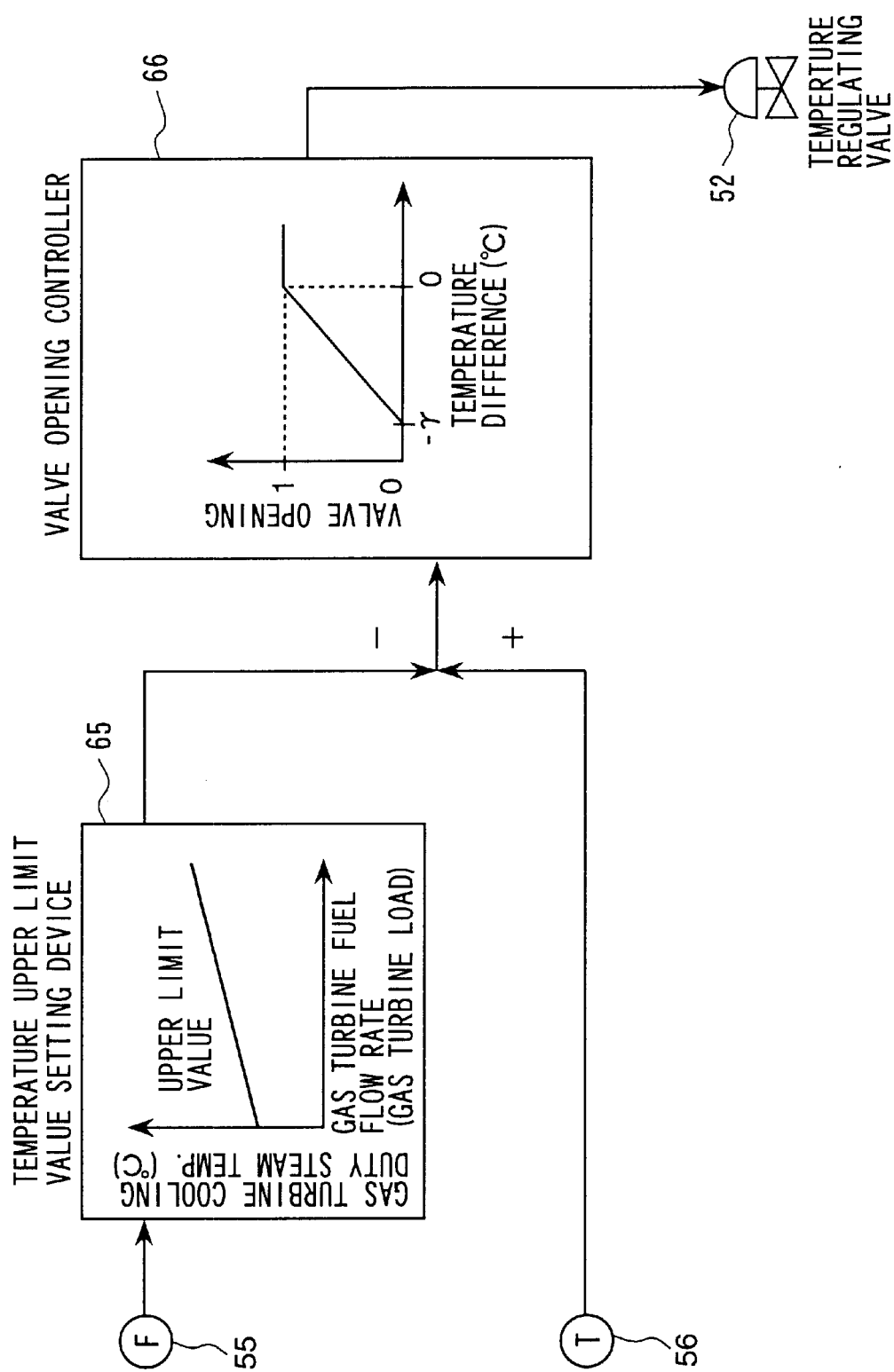
FIG. 16 is a control diagram of the fifth aspect of practical use of the present invention.

FIG. 16 shows a control diagram of gas turbine cooling duty steam temperature in the fifth aspect of practical use. Flow rates of gas turbine fuel detected by the fuel flow meter 55 approximately correspond to gas turbine loads. As for data representative of the gas turbine loads other than the above fuel flow rates, there are suction or exhaust gas flow rate of the gas turbine, compressed air delivery pressure, generator output when the generator is mounted only on the gas turbine, or the like.

An upper limit value of necessary temperature of gas turbine cooling duty steam, set according to the gas turbine load calculated from the gas turbine fuel flow rate is set by a temperature upper limit setter 65. A valve opening controller 66 regulates the temperature regulating valve 52 on the basis of difference between the above-mentioned temperature upper limit value and the gas turbine cooling duty steam supply temperature measured by the thermometer 56. The valve opening controller 66 issues a signal of fully opening the temperature regulating valve 52 when the gas turbine cooling duty steam temperature is at the upper limit value of the necessary temperature, decreases the opening of the temperature regulating valve 52 as the gas turbine cooling duty steam temperature becomes lower than the upper limit value of necessary temperature and issues a signal of closing the temperature regulating valve 52 when the gas turbine cooling duty steam temperature becomes lower by $\gamma$ ° C. than the necessary temperature upper limit value.

By this control, high pressure primary superheater outlet steam of low temperature is led to the high pressure tertiary superheater 15 through the high pressure secondary superheater bypass line 53 when the gas turbine cooling duty steam temperature is in the necessary temperature upper limit region, the high pressure steam temperature is lowered and the low temperature reheat temperature is lowered, whereby the gas turbine can be operated in safety.

In a sixth aspect of practical use of the present invention, in time of gas turbine load down, in the case where the allowable temperature range of gas turbine cooling duty steam, set for gas turbine safety operation lowers according to gas turbine load down and the gas turbine cooling duty steam temperature is estimated to become higher than the upper limit of the allowable temperature range because temperature down of the gas turbine cooling duty steam delays in time relative to the gas turbine load down because of heat transfer between the piping for steam and the steam, low temperature reheat steam supplied as the gas turbine cooling duty steam is lowered by lowering the high pressure steam temperature prior to the gas turbine load down and supplied to the gas turbine hot parts, the gas turbine cooling duty steam temperature is lowered until the gas turbine cooling duty steam temperature reaches to such a set value that the gas turbine cooling duty steam temperature will be within the allowable temperature range even during the gas turbine load down, and then the gas turbine load down starts. In the power plant of the present embodiment, since the high pressure steam is lowered, a part or all of steam generated in the high pressure primary superheater 19 is bypassed the high pressure secondary superheater 18 and led to the high pressure tertiary superheater 15.

Further, in the case where the steam in which mist is mixed is allowed to use as gas turbine cooling duty steam, a temperature reducing spray can be used for the high pressure steam prior to the gas turbine load down or it can be used on the gas turbine cooling duty steam line 37. Further, in the case where thermal stress generated due to temperature difference between the high pressure steam introduced into the steam turbine and the high temperature reheat steam, caused by lowering in temperature of the high pressure steam becomes bar to a rotor or casing of the steam turbine, for example, it is sufficient that the high temperature reheat steam is lowered in temperature, for example, by the temperature reducing spray so as to cope with the temperature reduction of the high pressure steam.

FIG. 12 shows cooling duty steam temperature set values set for gas turbine cooling duty steam when gas turbine load is decreased. In FIG. 12, the gas turbine cooling steam temperature for each gas turbine load when the gas turbine load is decreased, for example, at a rate of 5%/min, is set at a cooling duty steam temperature at which ° C. is subtracted from the cooling duty steam necessary temperature upper limit value.

Figure 17:
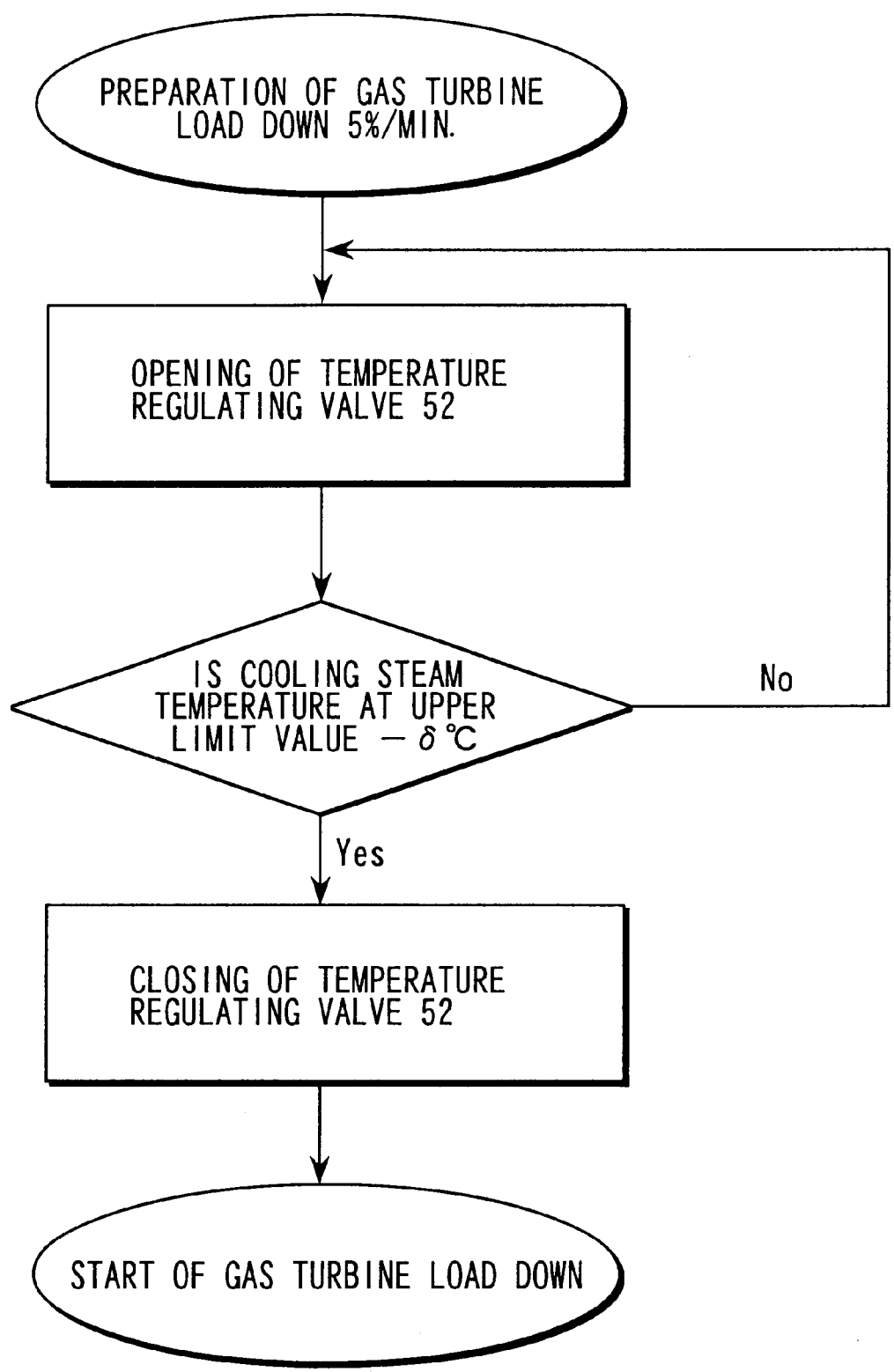
FIG. 17 is a flow chart of control showing the sixth aspect of practical use of the present invention.

FIG. 17 shows a flow chart of high pressure secondary superheater bypassing operation of the high pressure primary superheater outlet steam in the sixth aspect of practical use. In the case where the gas turbine load is lowered at a rate of 5%/min, the temperature regulating valve 52 is opened, and when the gas turbine cooling duty temperature becomes a temperature in the upper limit region $-\delta$ ° C., the temperature regulating valve 52 is closed.

Figure 18:
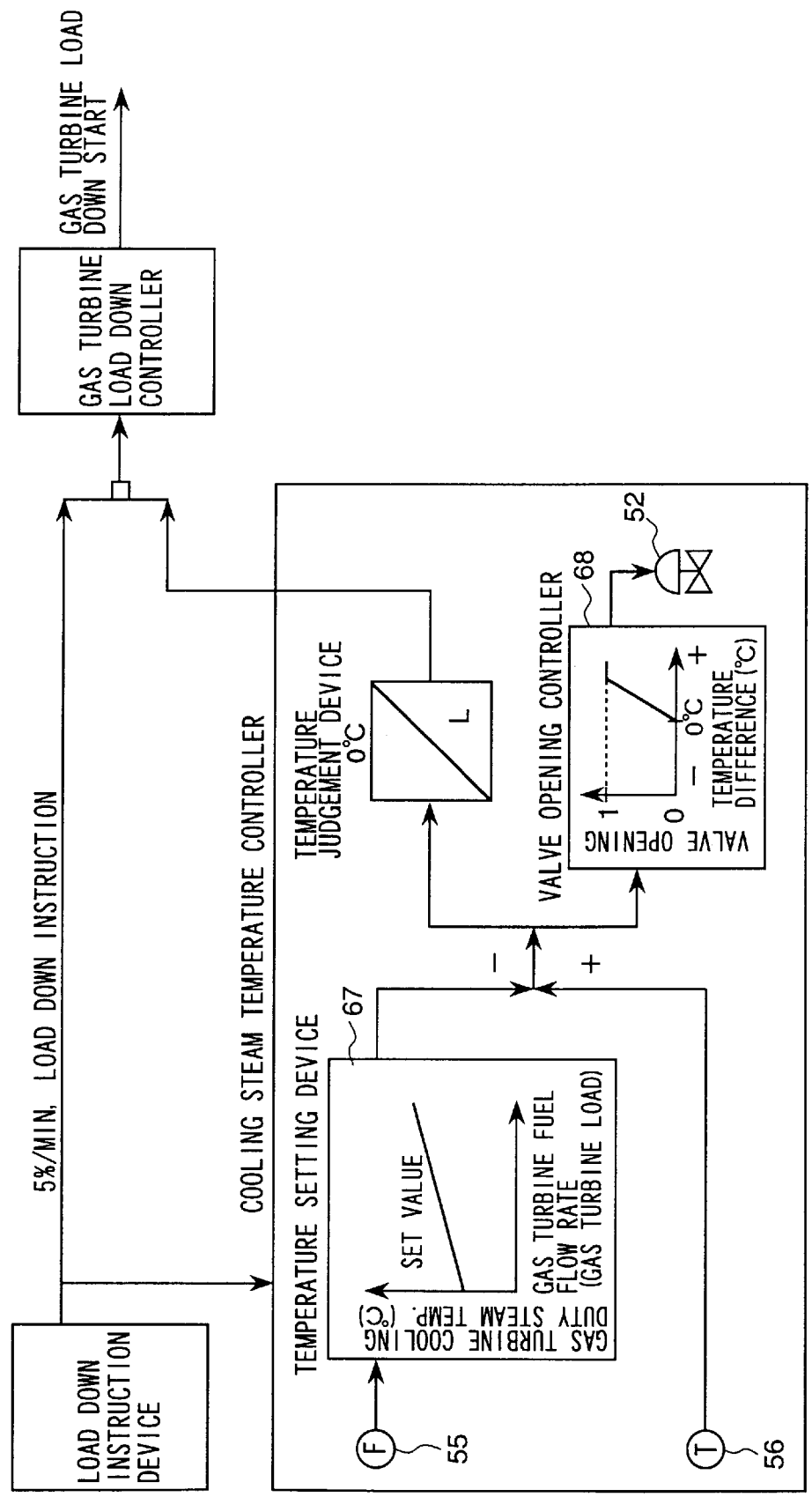
FIG. 18 is a control diagram of the sixth aspect of practical use of the present invention.

FIG. 18 shows a control diagram of gas turbine cooling duty steam temperature in the sixth aspect of practical use.

Gas turbine fuel flow rates detected by the fuel flow meter 55 approximately corresponds to a gas turbine load. As for data representative of the gas turbine loads other than the above fuel flow rates, there are suction or exhaust gas flow rate of the gas turbine, compressed air delivery pressure, generator output when the generator is mounted only on the gas turbine, or the like.

In the case where in order to effect plant load down, an instruction that the gas turbine load is lowered, for example, at a rate of 5%/min is issued, the cooling duty steam temperature obtained by subtracting δ ° C. from the upper limit value of the gas turbine cooling duty steam necessary temperature set according to the gas turbine load calculated on the basis of a gas turbine fuel flow rate at that time is set by the cooling duty steam temperature setter 67. The valve opening controller 68 regulates the temperature regulating valve 52 on the basis of difference between this temperature set value and the gas turbine cooling duty steam supply temperature measured by the thermometer 56. The valve opening controller 68 issues a signal of opening the temperature regulating valve 52 when the gas turbine cooling duty steam temperature is higher than the temperature set value, decreases the opening of the temperature regulating valve 52 as the gas turbine cooling duty steam temperature approaches to the temperature set value, and when the gas turbine cooling duty steam temperature becomes the temperature set value, issues a signal of closing the temperature regulating valve 52.

By this control, high pressure primary superheater outlet steam is led to the high pressure tertiary superheater 15 through the high pressure secondary superheater by pass line 53 until the gas turbine cooling duty steam temperature reaches to the temperature set value to lower the high pressure steam temperature thereby to lower the low temperature reheat temperature and the gas turbine cooling duty steam temperature, and when the gas turbine cooling duty steam temperature becomes the temperature set value and such danger disappears that the gas turbine cooling duty steam becomes higher than the cooling duty steam allowable temperature range even if the gas turbine cooling duty steam necessary temperature lowers by decreasing the gas turbine load, the gas turbine load is lowered, whereby the gas turbine can by operated in safety.

Further, even during gas turbine load down operation, cooling duty steam temperature control along the set value can be practiced by causing the high pressure primary superheater outlet steam to bypass the high pressure secondary superheater.

As mentioned above, according to the present invention, when gas turbine cooling duty steam is in a lower limit region of necessary temperature, hot high pressure steam is introduced into the gas turbine cooling duty steam supply line through cooling duty steam backup line, thereby to raise the gas turbine cooling duty steam temperature, whereby it is possible to operate the gas turbine safely.

Further, hot high pressure steam is introduced into the gas turbine cooling duty steam supply line through the cooling duty steam backup line until the gas turbine cooling duty steam temperature reaches to a temperature set value, thereby to raise the gas turbine cooling duty steam temperature, and when the gas turbine cooling duty steam temperature becomes the temperature set value and such danger disappears that the gas turbine cooling duty steam temperature will become lower than the cooling duty steam allowable temperature range even if the necessary temperature of the gas turbine cooling duty steam rises by gas turbine load up, the gas turbine load up is started, whereby it is possible to operate the gas turbine safely.

Further, when the gas turbine cooling duty steam is in an upper limit region of necessary temperature, low temperature high pressure primary superheater outlet steam is introduced into the gas turbine cooling duty steam supply line through the cooling duty steam backup line, thereby to lower the gas turbine cooling duty steam temperature, whereby it is possible to operate the gas turbine safely.

Further, the high pressure primary superheater outlet steam is introduced into the gas turbine cooling duty steam supply line through the cooling duty steam backup line until the gas turbine cooling duty steam temperature reaches to a temperature set value, thereby to lower the gas turbine cooling duty steam temperature, and when the gas turbine cooling duty steam temperature becomes the temperature set value and such danger disappears that the gas turbine cooling duty steam temperature will become higher than the cooling duty steam allowable temperature range even if the necessary temperature of the gas turbine cooling duty steam goes down by gas turbine load down, the gas turbine load down is started, whereby it is possible to operate the gas turbine safely.

Further, when gas turbine cooling duty steam is in an upper limit region of necessary temperature, low temperature high pressure primary super heater outlet steam is introduced into the high pressure tertiary superheater through the high pressure secondary superheater bypass line, thereby to lower the high pressure steam temperature, to lower low temperature reheat steam temperature and to lower the gas turbine cooling duty steam temperature, whereby it is possible to operate the gas turbine safely.

Further, high pressure primary superheater outlet steam is introduced into the high pressure tertiary superheater through the high pressure secondary superheater bypass line until the gas turbine cooling duty steam temperature reaches to a temperature set value, to lower the high pressure steam temperature, thereby to lower the low temperature reheat steam temperature and the gas turbine cooling duty steam temperature, and when the gas turbine cooling duty steam temperature becomes the temperature set value and such danger disappears that the gas turbine cooling duty steam temperature will become higher than the cooling duty steam allowable temperature range even if the necessary temperature of the gas turbine cooling duty steam lowers by gas turbine load down, the gas turbine load down is started, whereby it is possible to operate the gas turbine safely.

What is claimed is:

1. A combined power plant, comprising:
   a gas turbine having at least one hot part that is to be cooled with steam;
   a multi-pressure heat recovery steam generator generating steam by using exhaust gas from said gas turbine;
   a steam turbine using, as a power source, steam generated in said multi-pressure heat recovery steam generator; and
   a system for supplying gas turbine cooling duty steam for cooling the hot part of said gas turbine, comprising:
      a line, branching off from a steam line for leading high pressure steam turbine exhaust steam from a high pressure section of said steam turbine to a reheater of said multi-pressure heat recovery steam generator, and leading at least a part of the high pressure steam turbine exhaust steam to a gas turbine cooling duty steam supply line;
      a line, leading intermediate pressure steam from an intermediate pressure superheater of said multi-pressure heat recovery steam generator to the gas turbine cooling duty steam supply line; and a line, branching off from a steam line for leading high pressure steam from a high pressure superheater of said multi-pressure heat recovery steam generator to said high pressure steam turbine, and leading a part of the high pressure steam to the gas turbine cooling duty steam supply line, wherein a temperature lower limit region setting means is provided for setting a lower limit region within an allowable temperature range of gas turbine cooling duty steam for each gas turbine food, said lower limit region having a predetermined range starting from a lower limit of said allowable temperature range, and a control means for controlling steam supply, when the gas turbine cooling duty steam enters the lower limit region, so that a part of the high pressure steam of high temperature is supplied to the hot part of said gas turbine to raise the gas turbine cooling duty steam temperatyre so as to be higher than the lower limit region and to fall within the allowable temperature range whereby gas turbine cooling duty steam, the temperature of which is within the allowable temperature range, is supplied to the hot part of said gas turbine.

2. A combined power plant comprising a gas turnine having at least one hot part that it is to be cooled with steam;

a multi-pressure heat recovery steam generator generating steam by using exhaust gas from said gas turbine;

a steam turbine using, as a power source, steam generated in said multi-pressure heat recovery heat steam generator; and a system for supplying gas turbine cooling guy steam for cooling the hot part of said gas turbine, comprising:

a line, branching off from a steam line for leading high pressure steam turbine exhaust steam from a high pressure section of said steam turbine to a reheater of said multi-pressure heat recovery steam generator, and leading at least a part of the high pressure steam turbine exhaust steam to a gas turbine cooling duty steam supply line;

a line, leading intermediate pressure steam from an intermediate pressure superheater of said multi-pressure heat recovery steam generator to the gas turbine cooling duty steam supply line;

a line, branching off from a steam line for leading high pressure steam from a high pressure superheater of said multi-pressure heat recovery steam generator to said high pressure steam turbine, and leading a part of the high pressure steam to the gas turbine cooling duty steam supply line, wherein a cooling duty steam temperature rise control means for raising cooling duty steam temperature is provided which comprises a cooling duty steam temperature setting means for setting a cooling duty steam temperature so that a predetermined value is added to a lower limit value of the necessary temperature of gas turbine cooling duty steam set according to each gas turbine load, a steam control means for controlling steam supply to raise the temperature of cooling duty steam and a temperature judging means for comparing a measured gas turbine cooling duty steam temperature and a cooling duty steam set temperature set by said cooling duty steam temperature setting means, and wherein since the necessary temperature of the cooling duty steam rises as the gas turbine load rises, said control means controls steam supply so that a part of the high temperature high pressure steam is supplied to the hot part of said gas turbine prior to the rise of gas turbine load, and upon raising the gas turbine load, the gas turbine cooling duty steam is raised in temperature until the gas turbine cooling duty steam temperature reaches the cooling duty steam set temperature, and then the gas turbine load is raised.

3. A combined power plant comprising:

a gas turbine having at least one hot part that is to be cooled with steam;

a multi-pressure heat recovery steam generator generating steam by using exhaust gas from said gas turbine;

a steam turbine taking, as a power source, steam generated in said multi-pressure heat recovery team generator; and a system for supplying gas turbine cooling duty steam for cooling the hot part of said gas turbine, comprising a line, branching off from a steam line for leading high pressure steam turbine exhaust steam from a high pressure section of said steam turbine to a reheater of said multi-pressure heat recovery steam generator, and leading at least a part of the high pressure steam turbine exhaust steam to a gas turbine cooling duty steam supply pipe;

a line, leading intermediate pressure steam from an intermediate pressure superheater of said multi-pressure heat recovery steam generator to the gas turbine cooling duty steam supply pipe; and a line, having a construction in which a high pressure superheater is divided into two or more parts in said multi-pressure heat recovery steam generator and steam from a high pressure drum is introduced in series from a high pressure primary superheater to a high pressure secondary superheater, branching off from a steam line for leading steam from said high pressure primary superheater of said multi-pressure heat recovery steam generator to said high pressure secondary superheater, and leading a part of high pressure primary superheater outlet steam to the gas turbine cooling duty steam supply line, wherein a temperature upper limit region setting means is provided for setting an upper limit region within an allowable temperature range of gas turbine cooling duty steam for each gas turbine load, said upper limit region having a predetermined range starting from an upper limit of said allowable temperature range, and a control means for controlling steam supply, when the gas turbine cooling duty steam enters the upper limit region, so that a part of the high pressure primary superheater outlet steam lower than the gas turbine cooling duty steam is supplied to the hot part of said gas turbine to lower the gas turbine cooling duty steam temperature so as to lower than the upper limit region and to fall within the allowable temperature range, whereby the gas turbine cooling duty steam, the temperature of which is within the allowable temperature range, is supplied to the hot part of said gas turbine.

4. A combined power plant comprising:

a gas turbine having at least one hot part that is to be cooled with steam;

a multi-pressure heat recovery steam generator generating steam by using exhaust gas from said gas turbine;

a steam turbine using, as a power source, steam generated in said multi-pressure heat recovery steam generator; and a system for supplying gas turbine cooling duty steam for cooling the hot part of said gas turbine, comprising
a line, branching off from a steam line for leading high pressure steam turbine exhaust steam from a high pressure section of said steam turbine to a reheater of said multi-pressure heat recovery steam generator, and leading at least a part of the high pressure steam turbine exhaust steam to a gas turbine cooling duty steam supply pipe;
a line, leading intermediate pressure steam from an intermediate pressure superheater of said multi-pressure heat recovery steam generator to the gas turbine cooling duty steam supply pipe; and
a line, having a construction in which a high pressure superheater is divided into two or more parts in said multi-pressure heat recovery steam generator and steam from a high pressure drum is introduced in series from a high pressure primary superheater to a high pressure secondary superheater, branching off from a steam line for leading steam from said high pressure primary superheater of said multi-pressure heat recovery steam generator to said high pressure secondary superheater, and leading a part of high pressure primary superheater outlet steam to the gas turbine cooling duty steam supply pipe, wherein a cooling duty steam temperature lowering control means for lowering cooling duty steam temperature is provided which comprises a cooling duty steam temperature setting means for setting a cooling duty steam temperature so that a predetermined value is subtracted from an upper limit value of a necessary temperature of gas turbine cooling duty steam set according to each gas turbine load, a steam control means for controlling steam supply to lower the temperature of cooling duty steam and a temperature judging means for comparing a measured gas turbine cooling duty steam temperature and a cooling duty steam set temperature set by said cooling duty steam temperature, and wherein since the necessary temperature of the cooling duty steam lowers as the gas turbine lowers, said control means controls steam supply so that a part of the high pressure primary superheater outlet steam lower than the gas turbine cooling duty steam is supplied to the hot part of said gas turbine prior to the gas turbine load down, and upon lowering the gas turbine load, the gas turbine cooling duty steam is lowered in temperature until the gas turbine cooling duty steam temperature reaches the cooling duty steam set temperature, and then the gas turbine load is lowered.

5. A combined power plant comprising:
a gas turbine having at least one hot part that is to be cooled with steam;
a multi-pressure heat recovery steam generator generating steam by using exhaust gas from said gas turbine;
a steam turbine taking, as a power source, steam generated in said multi-pressure heat recovery steam generator; and
a system for supplying gas turbine cooling duty steam for cooling the high temperature portion of said gas turbine, comprising
a line, branching off from a steam line for leading high pressure steam turbine exhaust steam from a high pressure section of said steam turbine to a reheater of said multi-pressure heat recovery steam generator, and leading at least a part of the high pressure steam turbine exhaust steam to a gas turbine cooling duty steam supply pipe;
a line, leading intermediate pressure steam from an intermediate pressure superheater of said multi-pressure heat recovery steam generator to the gas turbine cooling duty steam supply pipe; and
a line, having a construction in which a high pressure superheater is divided into two or more parts in said multi-pressure heat recovery steam generator and the steam from a high pressure drum is introduced in series from a high pressure primary superheater to a high pressure secondary superheater, branching off from a steam line for leading steam from said high pressure primary superheater of said multi-pressure heat recovery steam generator to said high pressure secondary superheater, and causing high pressure primary superheater outlet steam to bypass said high pressure secondary superheater, wherein a temperature upper limit region setting means is provided for setting an upper limit region within an allowable temperature range of gas turbine cooling duty steam for each gas turbine load, said upper limit region having a predetermined range atrting from an upper limit of the allowable temperature range, and a control means for controlling steam supply, when the gas turbine cooling duty steam enters the upper high limit region, so that at least a part of the high pressure primary superheater outlet steam bypasses said high pressure secondary superheater to lower the high pressure steam temperature and to supply low temperature reheat steam lowered in temperature to the gas turbine hot part, thereby to lower the gas turbine cooling duty steam temperature from the upper limit region and supply the gas turbine cooling duty steam, the temperature of which is within the allowable temperature range.

6. A combined power plant comprising:
a gas turbine having at least one hot part that is to be cooled with steam;
a multi-pressure heat recovery steam generator generating steam by using exhaust gas from said gas turbine;
a steam turbine using, as a power source, steam generated in said multi-pressure heat recovery steam generator; and
a system for supplying gas turbine cooling duty steam for cooling the hot part of said gas turbine, comprising
a line, branching off from a steam line for leading high pressure steam turbine exhaust steam from a high pressure section of said steam turbine to a reheater of said multi-pressure heat recovery steam generator, and leading at least a part of the high pressure steam turbine exhaust steam to a gas turbine cooling duty steam supply pipe;
a line, leading intermediate pressure steam from an intermediate pressure superheater of said multi-pressure heat recovery steam generator to the gas turbine cooling duty steam supply pipe; and
a line, having a construction in which a high pressure superheater is divided into two or more parts in said multi-pressure heat recovery steam generator and the steam from a high pressure drum is introduced in series from a high pressure primary superheater to a high pressure secondary superheater, branching off from a steam line for leading steam from said high pressure primary superheater of said multi-pressure heat recovery steam generator to said high pressure secondary superheater, and causing high pressure primary superheater outlet steam to bypass said high pressure secondary superheater, wherein a cooling duty steam temperature lowering control means for lowering cooling duty steam temperature is provided which comprises a cooling duty steam temperature setting means for setting a cooling duty steam temperature so that a predetermined value is substracted from an upper limit value of a necessary temperature of cooling duty steam set according to each gas turbine load, a steam control means for controlling steam supply to lower the temperature of cooling duty steam and a temperature judging means for comparing a measured gas turbine cooling duty steam temperature and the gas turbine cooling duty steam set temperature set by said cooling duty steam setting means, and wherein since the allowable steam temperature range lowers as a gas turbine load goes down, said control means controls steam supply so that at least a part of the high pressure primary superheater outlet steam bypasses said high pressure secondary superheater to lower the high pressure steam temperature prior to the gas turbine load down to supply low temperature reheat steam lowered in temperature to the gas turbine hot part, and the gas turbine cooling duty steam temperature is lowered at time of lowering of gas turbine load until the gas turbine cooling duty steam temperature reaches the cooling duty steam set temperature and then the gas turbine load is lowered.

7. A combined power plant, comprising:

a gas turbine having a hot part that is to be cooled with steam;

a multi-pressure heat recover steam generator generating steam by using exhaust gas from said gas turbine;

a steam turbine using, as a power source, steam generated in said multi-pressure heat recovery steam generator; and a system for supplying gas turbine cooling duty steam for cooling the hot part of said gas turbine, comprising a first line, branching off from a steam line for leading high pressure steam turbine exhaust steam from a high pressure section of said steam turbine to a reheater of said multi-pressure heat recovery steam generator, and leading at least a part of the high pressure steam turbine exhaust steam to a gas turbine cooling duty steam supply line;

a second line, leading intermediate pressure steam from an intermediate pressure superheater of said multi-pressure heat recovery steam generator to the gas turbine cooling duty steam supply line; and a third line, branching off from a steam line for leading high pressure steam from a high pressure superheater of said multi-pressure heat recovery steam generator to said high pressure steam turbine, and leading a part of the high pressure steam to the gas turbine cooling duty steam supply line, wherein a temperature lower limit setting means for setting a lower temperature limit region within an allowable temperature range of gas turbine cooling duty steam for each load, said lower temperature lower limit region having a lower temperature limit equal to the allowable temperature range and a temperature range smaller than the allowable temperature range; and a control means for controlling a valve provided on said third line, when the gas turbine cooling duty steam is on or close to the lower temperature limit, so that a part of the high pressure steam of high temperature is supplied to the gas turbine cooling duty steam supply line so that the gas turbine cooling duty steam temperature reaches an upper limit of the temperature lower limit region, whereby the gas turbine cooling duty steam, the temperature of which is within the allowable temperature, is supplied to said hot part of said gas turbine.

* * * * *